US012801001B2

(12) United States Patent
Yan

(10) Patent No.: US 12,801,001 B2
(45) Date of Patent: Nov. 17, 2026

(54) LASER SOURCE ASSEMBLY AND PROJECTION APPARATUS

(71) Applicant: HISENSE LASER DISPLAY CO., LTD, Qingdao (CN)

(72) Inventor: Ke Yan, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 403 days.

(21) Appl. No.: 18/516,249

(22) Filed: Nov. 21, 2023

(65) Prior Publication Data

US 2024/0085771 A1 Mar. 14, 2024

Related U.S. Application Data

(63) Continuation-in-part of application No. PCT/CN2022/082083, filed on Mar. 21, 2022.

(30) Foreign Application Priority Data

May 31, 2021 (CN) ........................ 202110599419.3
Jun. 29, 2021 (CN) ........................ 202110729592.0

(51) Int. Cl.
*G03B 21/20* (2006.01)

(52) U.S. Cl.
CPC ..... *G03B 21/2033* (2013.01); *G03B 21/2073* (2013.01)

(58) Field of Classification Search
CPC ........................ G03B 21/2033; G03B 21/2073
(Continued)

(56) References Cited

U.S. PATENT DOCUMENTS

2009/0161072 A1 6/2009 Yamauchi et al.
2013/0135590 A1 5/2013 Homma et al.
(Continued)

FOREIGN PATENT DOCUMENTS

CN 102253500 A 11/2011
CN 103149780 A 6/2013
(Continued)

OTHER PUBLICATIONS

Chinese Notification of the Third Office Action mailed Sep. 7, 2024 in corresponding Chinese Application No. 202110727532.5, translated, 11 pages.

(Continued)

*Primary Examiner* — Jerry L Brooks
(74) *Attorney, Agent, or Firm* — MH2 Technology Law Group LLP

(57) ABSTRACT

A laser source assembly and a projection apparatus are provided. The laser source assembly includes a laser device, a combining lens group, and a polarization direction adjustment component. The laser device is configured to emit laser beams of a plurality of colors. The combining lens group is configured to combine the laser beams of the plurality of colors and propagate the combined laser beams in a first direction. The polarization direction adjustment component is configured to adjust a polarization direction of at least a portion of the laser beams of the plurality of colors to obtain a target laser beam. A laser beam of at least one color in the target laser beam satisfies that the polarization direction of a portion of the laser beam of a same color is different from the polarization direction of another portion of the laser beam of a same color.

18 Claims, 13 Drawing Sheets

(58) Field of Classification Search
USPC .............................................................. 353/31
See application file for complete search history.

(56) References Cited

U.S. PATENT DOCUMENTS

| | | | | |
|---|---|---|---|---|
| 2014/0354956 | A1 | 12/2014 | Yamada et al. | |
| 2015/0249521 | A1 * | 9/2015 | Ono | G02B 27/48 398/65 |
| 2017/0339378 | A1 | 11/2017 | Okumura | |
| 2019/0041735 | A1 * | 2/2019 | Tanaka | H04N 9/3167 |
| 2020/0201161 | A1 | 6/2020 | Tian et al. | |
| 2020/0218081 | A1 | 7/2020 | Yang | |
| 2020/0301158 | A1 | 9/2020 | Yang | |
| 2022/0004092 | A1 * | 1/2022 | Chien | G03B 33/12 |

FOREIGN PATENT DOCUMENTS

| | | | |
|---|---|---|---|
| CN | 104503098 | A | 4/2015 |
| CN | 107505807 | A | 12/2017 |
| CN | 207281393 | U | 4/2018 |
| CN | 207457625 | U | 6/2018 |
| CN | 110275374 | A | 9/2019 |
| CN | 110928123 | A | 3/2020 |
| CN | 210534521 | U | 5/2020 |
| CN | 210954574 | U | 7/2020 |
| CN | 111562713 | A | 8/2020 |
| CN | 111947592 | A | 11/2020 |
| CN | 212276207 | U | 1/2021 |
| CN | 112731749 | A | 4/2021 |
| CN | 112987471 | A | 6/2021 |
| CN | 112987472 | A | 6/2021 |
| CN | 113376947 | A | 9/2021 |

OTHER PUBLICATIONS

International Search Report and Written Opinion dated Apr. 28, 2022 in corresponding International Application No. PCT/CN2022/077331, translated, 11 pages.
International Search Report and Written Opinion dated Jun. 2, 2022 in corresponding International Application No. PCT/CN2022/082083, translated, 17 pages.
Chinese First Office Action dated Dec. 15, 2021 in corresponding Chinese Application No. 202110199371.7, translated, 18 pages.
Chinese Second Office Action dated Jun. 7, 2022 in corresponding Chinese Application No. 202110199371.7, translated, 18 pages.
Chinese Decision of Rejection dated Nov. 3, 2022 in corresponding Chinese Application No. 202110199371.7, translated, 16 pages.
Chinese First Office Action dated Dec. 15, 2021 in corresponding Chinese Application No. 202110199377.4, translated, 17 pages.
Chinese Second Office Action dated Jun. 7, 2022 in corresponding Chinese Application No. 202110199377.4, translated, 17 pages.
Chinese Decision of Rejection dated Nov. 8, 2022 in corresponding Chinese Application No. 202110199377.4, translated, 15 pages.
Chinese Notification of the First Office Action dated Jan. 6, 2024 in corresponding Chinese Application No. 202110727532.5, translated, 14 pages.
Chinese First Office Action dated Feb. 21, 2022 in corresponding Chinese Application No. 202110729592.0, translated, 12 pages.
Chinese Second Office Action dated Jun. 28, 2022 in corresponding Chinese Application No. 202110729592.0, translated, 10 pages.
Chinese Third Office Action dated Sep. 5, 2022 in corresponding Chinese Application No. 202110729592.0, translated, 11 pages.
Chinese Decision of Rejection dated Dec. 20, 2022 in corresponding Chinese Application No. 202110729592.0, translated, 11 pages.
Chinese First Office Action dated Apr. 25, 2026 in corresponding Chinese Application No. 202280030431.5, translated, 19 pages.

* cited by examiner

LASER SOURCE ASSEMBLY AND PROJECTION APPARATUS

CROSS-REFERENCE TO RELATED APPLICATIONS

This application is a continuation-in-part application of International Patent Application No. PCT/CN2022/082083, filed on Mar. 21, 2022, which claims priority to Chinese Patent Application No. 202110599419.3, filed on May 31, 2021, and Chinese Patent Application No. 202110729592.0, filed on Jun. 29, 2021, which are incorporated herein by reference in their entireties.

TECHNICAL FIELD

The present disclosure relates to the field of photoelectric technologies, and in particular, to a laser source assembly and a projection apparatus.

BACKGROUND

With the development of photoelectric technologies, consumers have higher and higher requirements for the projection effect of projection apparatuses. The projection apparatus includes a laser source assembly, a light modulation assembly, and a projection lens. Illumination beams provided by the laser source assembly are modulated by the light modulation assembly and become projection beams. The projection beams are projected onto a screen or a wall by the projection lens, so as to form a projection image.

SUMMARY

In an aspect, a laser source assembly is provided. The laser source assembly includes at least one laser device, at least one combining lens group, and at least one polarization direction adjustment component. The at least one laser device is configured to emit laser beams of a plurality of colors. The at least one combining lens group is located on a laser-exit side of the at least one laser device and configured to combine the laser beams of the plurality of colors and propagate the combined laser beams in a first direction. The at least one polarization direction adjustment component is configured to adjust a polarization direction of at least a portion of the laser beams of the plurality of colors, so as to obtain a target laser beam. A laser beam of at least one color in the target laser beam satisfies that a polarization direction of a portion of the laser beam of a same color is different from a polarization direction of another portion of the laser beam of the same color. The polarization direction adjustment component satisfies one of following: the polarization direction adjustment component is located between the at least one laser device and the at least one combining lens group, and an orthogonal projection of the polarization direction adjustment component on a laser-exit surface of the laser device overlaps with at least a portion of the laser-exit surface of the laser device. The polarization direction adjustment component is located on a laser-exit side of the at least one combining lens group and on a plane perpendicular to the first direction. The orthogonal projection of the polarization direction adjustment component overlaps with at least a portion of an orthogonal projection of the combining lens group.

In another aspect, a projection apparatus is provided. The projection apparatus includes a laser source assembly, a light modulation assembly, and a projection lens. The laser source assembly includes the above laser source assembly and is configured to emit illumination beams. The light modulation assembly is configured to modulate the illumination beams emitted by the laser source assembly, so as to obtain projection beams. The projection lens is configured to project the projection beams into a projection image.

DETAILED DESCRIPTION

Figure 1:
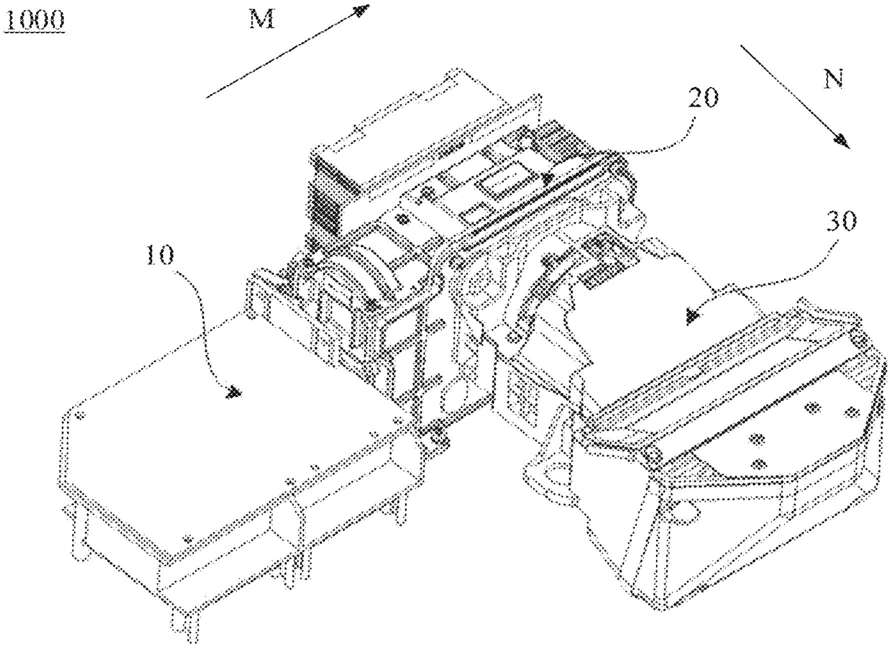
FIG. 1 is a diagram showing a structure of a projection apparatus, in accordance with some embodiments.

Some embodiments of the present disclosure will be clearly and completely described below with reference to the accompanying drawings. However, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited thereto." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only and are not to be construed as indicating or implying the relative importance or implicitly indicating the number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the expression "connected" and derivatives thereof may be used. The term "connected" should be understood in a broad sense. For example, the term "connected" may represent a fixed connection, a detachable connection, or a one-piece connection, or may represent a direct connection, or may represent an indirect connection through an intermediate medium. The embodiments disclosed herein are not necessarily limited to the content herein.

The phrase "at least one of A, B, and C" has the same meaning as the phrase "at least one of A, B, or C," both including the following combinations of A, B, and C: only A, only B, only C, a combination of A and B, a combination of A and C, a combination of B and C, and a combination of A, B, and C.

The use of the phrase "applicable to" or "configured to" herein means an open and inclusive expression, which does not exclude devices that are applicable to or configured to perform additional tasks or steps.

The term such as "about," "substantially," and "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system).

Generally, due to strong coherence of laser beams emitted by a laser source assembly of a projection apparatus, there is a serious speckle phenomenon in the projection image projected by the projection apparatus, and the projection image has a poor display effect.

In order to solve the above problem, some embodiments of the present disclosure provide a projection apparatus 1000, so as to use the projection apparatus 1000 to reduce the speckle phenomenon in the projection image and improve the display effect of the projection image.

FIG. 1 is a diagram showing a structure of a projection apparatus, in accordance with some embodiments. As shown in FIG. 1, the projection apparatus 1000 includes a laser source assembly 10, a light modulation assembly 20, and a projection lens 30. The laser source assembly 10 is configured to provide illumination beams. The light modulation assembly 20 is configured to modulate the illumination beams provided by the laser source assembly 10 with image signals, so as to obtain projection beams. The projection lens 30 is configured to project the projection beams into an image on a screen or a wall.

The laser source assembly 10, the light modulation assembly 20, and the projection lens 30 are sequentially connected in a propagation direction of beams. In some examples, an end of the light modulation assembly 20 is connected to the laser source assembly 10, and the laser source assembly 10 and the light modulation assembly 20 are arranged in an exit direction (referring to the direction M shown in FIG. 1) of the illumination beams of the projection apparatus 1000. Another end of the light modulation assembly 20 is connected to the projection lens 30, and the light modulation assembly 20 and the projection lens 30 are arranged in an exit direction (referring to the direction N shown in FIG. 1) of the projection beams of the projection apparatus 1000.

In some examples, as shown in FIG. 1, the exit direction M of the illumination beams of the projection apparatus 1000 is substantially perpendicular to the exit direction N of the projection beams of the projection apparatus 1000. In this way, the structure the projection apparatus 1000 may be arranged reasonably, and a length of a beam path of the projection apparatus 1000 in a direction (e.g., the direction M or the direction N) may be prevented from being too long.

In some embodiments, the laser source assembly 10 may sequentially provide beams of three primary colors (beams of other colors may also be added on a basis of the beams of three primary colors). Due to the persistence of vision phenomenon of the human eyes, what the human eyes see is white beams formed by mixing the beams of three primary colors. Alternatively; the laser source assembly 10 may also simultaneously output the beams of three primary colors, so as to continuously emit the white beams. The laser source assembly 10 includes a laser device. The laser device may emit laser beams of at least one color, such as red laser beams, blue laser beams, or green laser beams.

Figure 2:
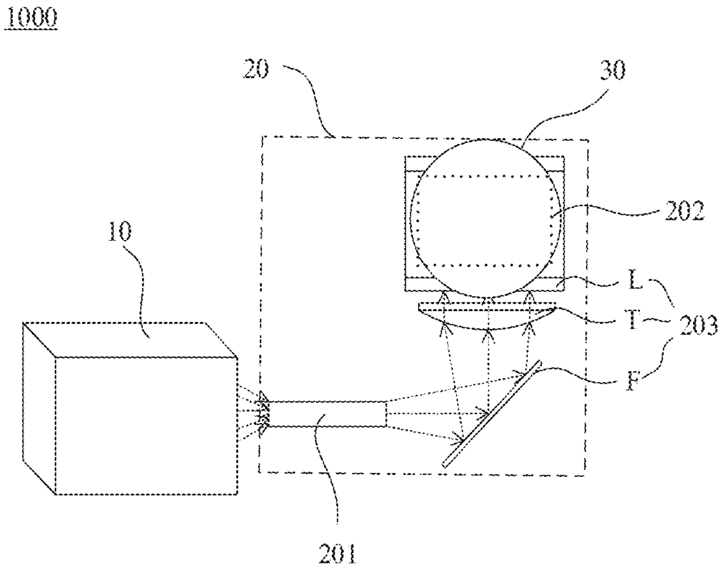
FIG. 2 is a diagram showing a beam path of a laser source assembly, a light modulation assembly, and a projection lens in a projection apparatus, in accordance with some embodiments.
Figure 3:
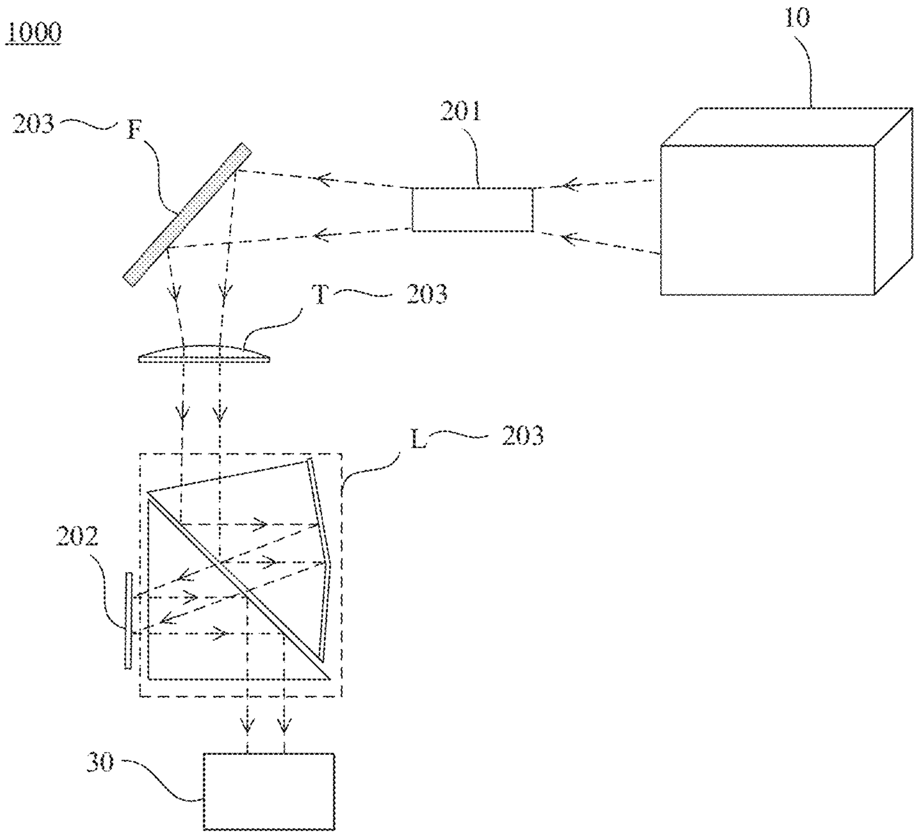
FIG. 3 is a diagram showing another beam path of a laser source assembly, a light modulation assembly, and a projection lens in a projection apparatus, in accordance with some embodiments.

FIG. 2 is a diagram showing a beam path of a laser source assembly, a light modulation assembly, and a projection lens in a projection apparatus, in accordance with some embodiments. FIG. 3 is a diagram showing another beam path of a laser source assembly, a light modulation assembly, and a projection lens in a projection apparatus, in accordance with some embodiments.

The illumination beams emitted by the laser source assembly 10 enter the light modulation assembly 20. Referring to FIGS. 2 and 3, the light modulation assembly 20 includes a first light homogenizing component 201 and a light valve 202. The first light homogenizing component 201 may homogenize the incident laser beams and then propagate the homogenized laser beams to the light valve 202. The light valve 202 may modulate the incident laser beams and propagate the modulated laser beams to the projection lens 30.

As shown in FIGS. 2 and 3, the first light homogenizing component 201 may include a light pipe. The light pipe may receive the illumination beams provided by the laser source assembly 10 and homogenize the illumination beams. In addition, a beam outlet of the light pipe may be in a shape of a rectangle, so as to have a shaping effect on a beam spot. Of course, in some embodiments, the first light homogenizing component 201 may also include a group of fly-eye lenses.

The light valve 202 may include a plurality of reflective plates, and each of the reflective plates may be used to form a pixel in the projection image. The plurality of reflective plates may be adjusted according to an image to be displayed, so that the reflective plates corresponding to the pixels in the image that need to be displayed in a bright state reflect the laser beams to the projection lens 30, so as to achieve the modulation of the illumination beams.

Figure 4:
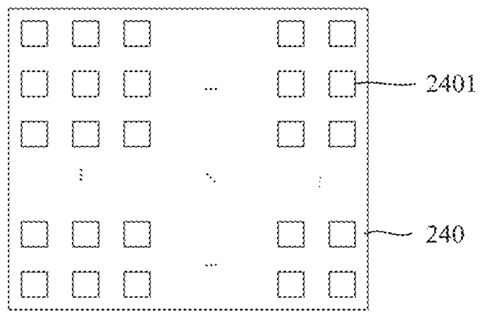
FIG. 4 is a diagram showing an arrangement of micromirrors in a digital micromirror device, in accordance with some embodiments.
Figure 5:
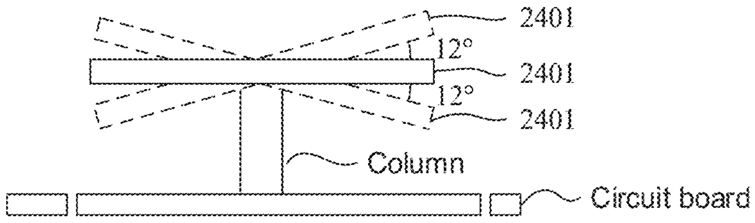
FIG. 5 is a diagram showing a swing position of a micromirror in the digital micromirror device shown in FIG. 4.

FIG. 4 is a diagram showing an arrangement of micromirrors in a digital micromirror device, in accordance with some embodiments. FIG. 5 is a diagram showing a swing position of a micromirror in the digital micromirror device shown in FIG. 4.

For example, the light valve 202 includes a digital micromirror device (DMD) 240. The digital micromirror device 240 modulates the illumination beams provided by the laser source assembly 10 through the image signals. That is to say, the digital micromirror device 240 controls the projection beams to display different luminance and gray scales according to different pixels in the image to be displayed, so as to finally produce an optical image. As shown in FIG. 4, the digital micromirror device 240 includes thousands of micromirrors 2401 that may be individually driven to rotate. These micromirrors 2401 are arranged in an array. One micromirror 2401 (e.g., each micromirror 2401) corresponds to one pixel in the projection image to be displayed. As shown in FIG. 5, in a digital light processing (DLP) projection architecture, each micromirror 2401 is equivalent to a digital switch. The micromirror 2401 may swing within a range of plus 12° to minus 12° (i.e., ±12°) or a range of plus 17° to minus 17° (i.e., ±17°) due to an action of an external force.

Figure 6:
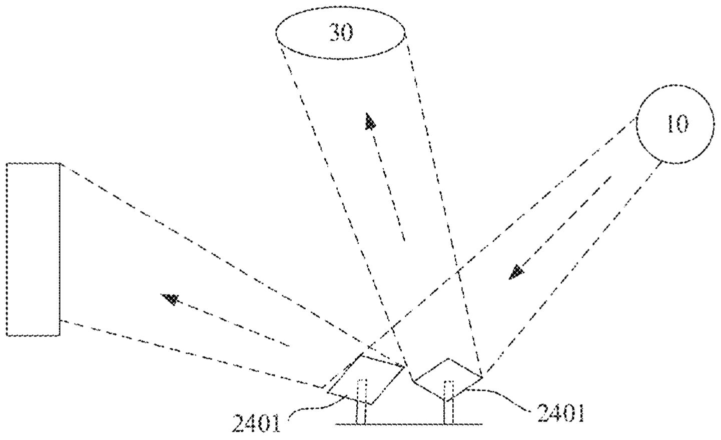
FIG. 6 is a schematic diagram showing operation of micro mirrors, in accordance with some embodiments.

FIG. 6 is a schematic diagram showing operation of micromirrors, in accordance with some embodiments.

As shown in FIG. 6, a laser beam reflected by the micromirror 2401 at a negative deflection angle is referred to as an OFF laser beam, and the OFF laser beam is an ineffective laser beam, which usually irradiates on the housing of the light modulation assembly 20 or is absorbed by other components. A laser beam reflected by the micromirror 2401 at a positive deflection angle is referred to as an ON laser beam. The ON laser beam is an effective laser beam reflected by the micromirror 2401 on a surface of the DMD 240 when it receives irradiation of the illumination beams, and the ON laser beam enters the projection lens 30 at a positive deflection angle for projection imaging. An ON state of the micromirror 2401 is a state that the micromirror 2401 is in and may be maintained when the illumination beams emitted by the laser source assembly 10 may enter the projection lens 30 after being reflected by the micromirror 2401, That is to say, the micromirror 2401 is in a state of the positive deflection angle. An OFF state of the micromirror 2401 is a state that the micromirror 2401 is in and may be maintained when the illumination beams emitted by the laser source assembly 10 do not enter the projection lens 30 after being reflected by the micromirror 2401. That is to say, the micromirror 2401 is in a state of the negative deflection angle.

For example, for a micromirror 2401 with a deflection angle of minus 12° or plus 12°, a state that the micromirror 2401 with the deflection angle of plus 12° is in is the ON state, and a state that the micromirror 2401 with the deflection angle of minus 12° is in is the OFF state. For a micromirror 2401 with a deflection angle of minus 17° or plus 17°, a state that the micromirror 2401 with the deflection angle of plus 17° is in is the ON state, and a state that the micromirror 2401 with the deflection angle of minus 17° is in is the OFF state. The image signals may be converted into digital codes such as 0 or 1 after being processed, and the micromirror 2401 may swing in response to these digital codes.

In a display cycle of a frame of an image, some or all of the micromirrors 2401 are switched once between the ON state and the OFF state, so that gray scales of pixels in a frame of an image are achieved according to durations of the micromirrors 2401 in the ON state and the OFF state. For example, in a case where the pixels have 256 gray scales from 0 to 255, micromirrors 2401 corresponding to a gray scale 0 are each in the OFF state in an entire display cycle of a frame of an image, micromirrors 2401 corresponding to a gray scale 255 are each in the ON state in the entire display cycle of a frame of an image, and micromirrors 2401 corresponding to a gray scale 127 are each in the ON state for half of time and in the OFF state for another half of time in the display cycle of a frame of an image. Therefore, by controlling a state that each micromirror 2401 in the DMD 240 is in and a duration of each state in the display cycle of a frame of an image through the image signals, luminance (the gray scale) of a pixel corresponding to the micromirror 2401 may be controlled, thereby modulating the illumination beams projected onto the DMD 240.

It will be noted that, according to different projection architectures, the light valve 202 may be of many kinds, such as a liquid crystal on silicon (LOOS) or the digital micromirror device. In some embodiments of the present disclosure, the light modulation assembly 20 shown in FIG. 3 applies the DUD projection architecture. Therefore, in some embodiments of the present disclosure, descriptions are mainly given by considering an example in which the light valve 202 includes the digital micromirror device.

In some embodiments, as shown in FIGS. 2 and 3, the projection apparatus 1000 further includes an illuminating lens group 203 located between the first light homogenizing component 201 and the light valve 202. The laser beams homogenized by the first light homogenizing component 201 may be incident on the light valve 202 through the illuminating lens group 203. The illuminating lens group 203 includes a reflective sheet F, a lens T (e.g., a convex lens), and a total internal reflection (TIR) prism L. The laser beams exiting from the first light homogenizing component 201 may be incident on the reflective sheet F, and the reflective sheet F may reflect the incident laser beams to the lens T. The lens T may converge the incident laser beams to the total internal reflection prism L, and the total internal reflection prism L reflects the incident laser beams to the light valve 202.

Figure 7:
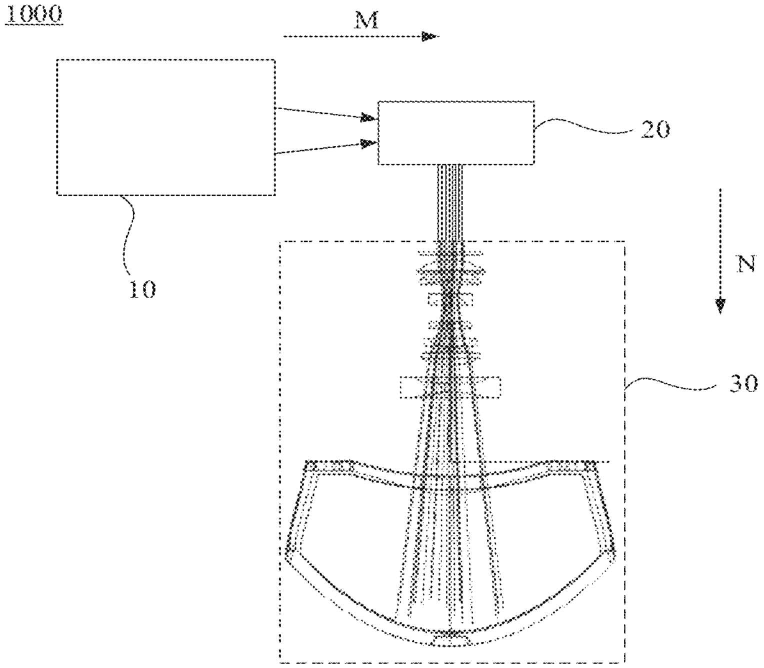
FIG. 7 is a diagram showing yet another beam path of a laser source assembly, a light modulation assembly, and a projection lens in a projection apparatus, in accordance with some embodiments.

FIG. 7 is a diagram showing yet another beam path of a laser source assembly, a light modulation assembly, and a projection lens in a projection apparatus, in accordance with some embodiments.

As shown in FIG. 7, the projection lens 30 includes a combination of a plurality of lenses, which are usually divided by group, and are divided into a three-segment combination including a front group, a middle group, and a rear group, or a two-segment combination including a front group and a rear group. The front group is a lens group proximate to a laser-exit side of the projection apparatus 1000 (i.e., a side of the projection lens 30 away from the light modulation assembly 20 in the direction N in FIG. 7), and the rear group is a lens group proximate to a laser-exit side of the light modulation assembly 20 (i.e., a side of the projection lens 30 proximate to the light modulation assembly 20 in the opposite direction of the direction N in FIG. 7).

The laser source assembly 10 according to some embodiments of the present disclosure will be described in detail below.

Figure 8A:
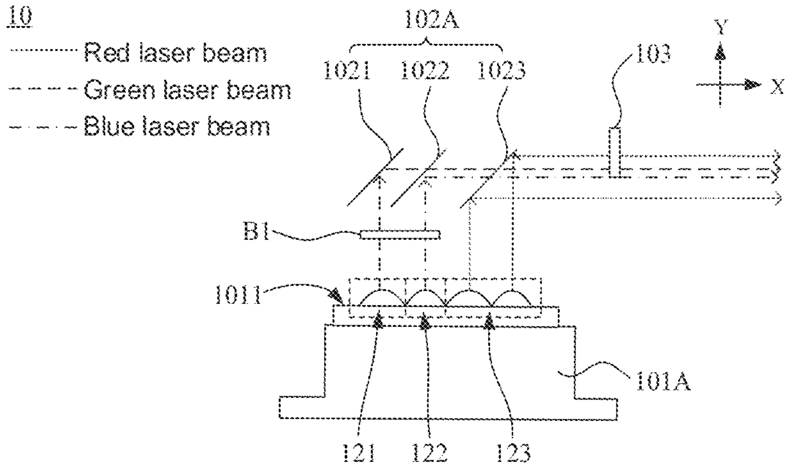
FIG. 8A is a diagram showing a structure of a laser source assembly, in accordance with some embodiments.
Figure 8B:
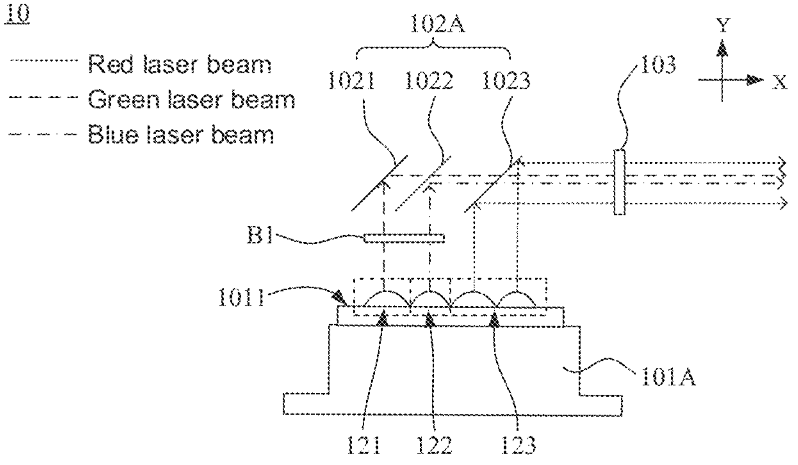
FIG. 8B is a diagram showing another structure of a laser source assembly, in accordance with some embodiments.

FIG. 8A is a diagram showing a structure of a laser source assembly, in accordance with some embodiments. FIG. 8B is a diagram showing another structure of a laser source assembly, in accordance with some embodiments.

As shown in FIGS. 8A and 8B, the laser source assembly 10 includes a first laser device 101A, a first combining lens group 102A, and a polarization direction adjustment component 103. It will be noted that a polarization direction of a laser beam may reflect a polarity of the laser beam. Adjusting the polarization direction of the laser beam may mean adjusting the polarity of the laser beam.

The first laser device 101A includes a multi-color laser device and is configured to emit laser beams of a plurality of colors.

Figure 9A:
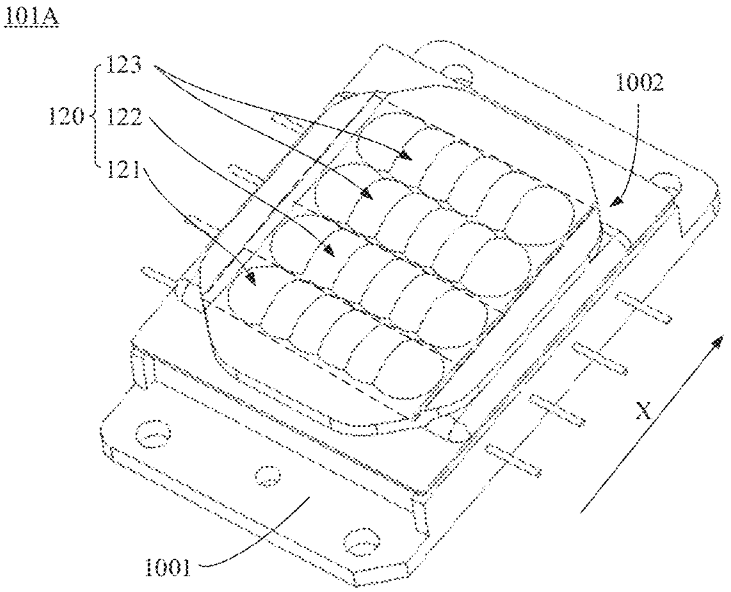
FIG. 9A is a diagram showing a structure of a first laser device, in accordance with some embodiments.
Figure 9B:
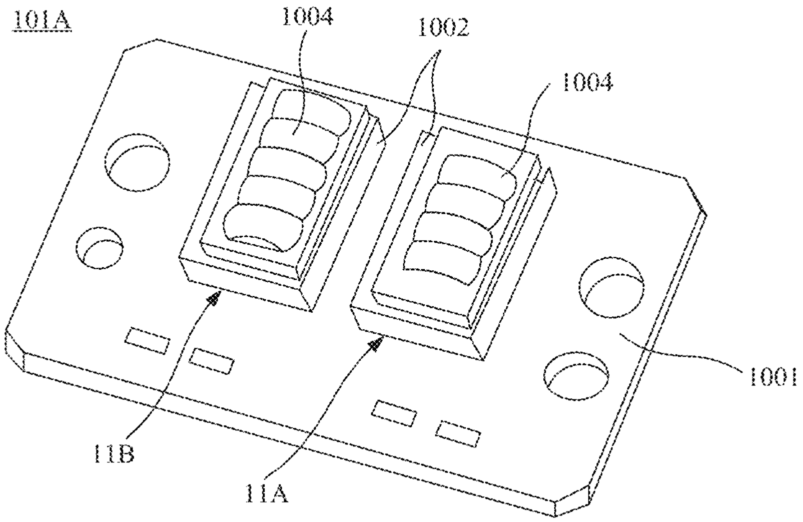
FIG. 9B is a diagram showing a structure of another first laser device, in accordance with some embodiments.
Figure 9C:
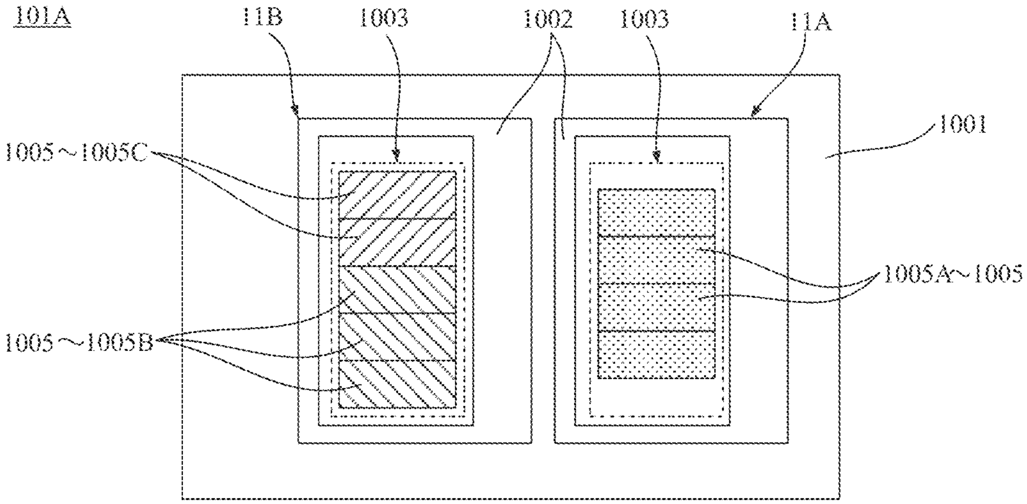
FIG. 9C is a diagram showing a partial structure of the first laser device in FIG. 9B.

FIG. 9A is a diagram showing a structure of a first laser device, in accordance with some embodiments. FIG. 9B is a diagram showing a structure of another first laser device, in accordance with some embodiments. FIG. 9C is a diagram showing a partial structure of the first laser device in FIG. 9B. FIG. 9C illustrates an internal structure of the first laser device in FIG. 9B.

In some embodiments, as shown in FIG. 9A, the first laser device 101A includes a multi-chip laser diode (MCL) device. The first laser device 101A includes a plurality of light-emitting chips arranged in an array. The plurality of light-emitting chips are configured to emit laser beams of a plurality of colors. The plurality of light-emitting chips form a plurality of laser-exit regions 120.

For example, the first laser device 101A includes a first laser-exit region 121, a second laser-exit region 122, and a third laser-exit region 123, In FIG. 9A, for convenience of distinction, each laser-exit region is separated by dotted lines. The first laser-exit region 121, the second laser-exit region 122, and the third laser-exit region 123 are sequentially arranged in a first direction X. The first laser-exit region 121 is configured to emit a first color laser beam, the second laser-exit region 122 is configured to emit a second color laser beam, and the third laser-exit region 123 is configured to emit a third color laser beam. The first color laser beam, the second color laser beam, and the third color laser beam are combined to form a white beam. Here, combining laser beams may be construed as adjusting the laser beams of different colors to a substantially same beam path, so that the laser beams of different colors may be incident on a same region.

For example, the first color laser beam includes a green laser beam, the second color laser beam includes a blue laser beam, and the third color laser beam includes a red laser beam. Of course, the three laser-exit regions may also emit laser beams of other colors. The present disclosure does not limit the colors of the first color laser beam, the second color laser beam, and the third color laser beam, as long as the first color laser beam, the second color laser beam, and the third color laser beam may be combined to form the white beam.

The following is mainly described by considering an example in which the first color laser beam includes the green laser beam, the second color laser beam includes the blue laser beam, and the third color laser beam includes the red laser beam.

It will be noted that the first laser device 101A further includes a base plate 1001 and a tube shell 1002 disposed on the base plate 1001 and surrounding the plurality of light-emitting chips. For example, the plurality of light-emitting chips arranged in an array shown in FIG. 9A are encapsulated in a tube shell 1002.

Of course, the first laser device 101A may further include a plurality of tube shells 1002, and the plurality of light-emitting chips in the first laser device 101A may be surrounded by the plurality of tube shells 1002.

As shown in FIGS. 9B and 9C, the first laser device 101A includes a base plate 1001, a plurality of tube shells 1002, a plurality of light-emitting chip groups 1003, and a plurality of collimating lens groups 1004. The plurality of tube shells 1002 are disposed on the base plate 1001 and surround the plurality of light-emitting chip groups 1003, respectively. For example, the tube shell 1002 has an annular shape (e.g., a square ring) and is mounted on the base plate 1001. Of course, the tube shell 1002 may also be in a shape of a circular ring or a pentagonal ring. The plurality of light-emitting chip groups 1003 each may include a plurality of light-emitting chips 1005 arranged in an array and configured to emit laser beams. The laser beams emitted by the light-emitting chips 1005 in different light-emitting chip groups 1003 have different colors. The plurality of collimating lens groups 1004 are disposed on the plurality of tube shells 1002 respectively and configured to collimate the laser beams emitted by the plurality of light-emitting chips 1005.

For example, as shown in FIGS. 93 and 9C, the first laser device 101A includes two tube shells 1002, two light-emitting chip groups 1003, and two collimating lens groups 1004. The two tube shells 1002 surround the two light-emitting chip groups 1003, respectively. The two light-emitting chip groups 1003 are arranged in two rows and include a first light-emitting chip group and a second light-emitting chip group. One light-emitting chip group 1003 (i.e., the first light-emitting chip group) includes a plurality of first light-emitting chips 1005A, and another light-emitting chip group 1003 (i.e., the second light-emitting chip group) includes a plurality of second light-emitting chips 1005E and a plurality of third light-emitting chips 1005C.

The first light-emitting chip 1005A is configured to emit the third color laser beam (e.g., the red laser beam), the second light-emitting chip 1005E is configured to emit the first color laser beam (e.g., the green laser beam), and the third light-emitting chip 1005C is configured to emit the second color laser beam (e.g., the blue laser beam). For ease of description, the combination of the plurality of first light-emitting chips 1005A, the corresponding tube shell 1002, and the corresponding collimating lens group 1004 may be referred to as a first light-emitting component 11A, and the combination of the plurality of second light-emitting chips 1005B, the plurality of third light-emitting chips 1005C, the corresponding tube shell 1002, and the corresponding collimating lens group 1004 may be referred to as a second light-emitting component 11B.

Of course, the first laser device 101A may also include three, four, or more tube shells 1002, the light-emitting chip groups 1003, and the collimating lens groups 1004, but the present disclosure is not limited thereto.

The first combining lens group 102A is located on a laser-exit side of the first laser device 101A and configured to combine the laser beams of a plurality of colors emitted by the first laser device 101A and propagate the combined laser beams in the first direction X. Here, the first direction X is a propagating direction of the combined laser beams.

In some embodiments, the first combining lens group 102A may include a plurality of combining lenses sequentially arranged in the first direction X, and the plurality of combining lenses correspond to the plurality of laser-exit regions 120 of the first laser device 101A, respectively. A combining lens is located on a laser-exit side of the corresponding laser-exit region 120. The laser beam exiting from the laser-exit region 120 is incident on the corresponding combining lens, and the combining lens reflects the laser beam exiting from the corresponding laser-exit region 120 in the first direction X.

For example, as shown in FIGS. 8A and 8B, the first combining lens group 102A includes a first combining lens 1021, a second combining lens 1022, and a third combining lens 1023 that are sequentially arranged in the first direction X. The first combining lens 1021 is located on a laser-exit side of the first laser-exit region 121, the second combining lens 1022 is located on a laser-exit side of the second laser-exit region 122, and the third combining lens 1023 is located on a laser-exit side of the third laser-exit region 123.

The first combining lens 1021 may reflect the first color laser beam to the second combining lens 1022. The second combining lens 1022 may be a dichroic mirror, and the second combining lens 1022 may transmit the first color laser beam and reflect the second color laser beam. The second combining lens 1022 transmits the first color laser beam exiting from the first combining lens 1021 to the third combining lens 1023 in the first direction X and reflects the second color laser beam exiting from the second laser-exit region 122 to the third combining lens 1023.

The third combining lens 1023 may also be a dichroic mirror, and the third combining lens 1023 may transmit the first color laser beam and the second color laser beam and reflect the third color laser beam. The third combining lens 1023 transmits the first color laser beam and the second color laser beam exiting from the second combining lens 1022 to the polarization direction adjustment component 103 in the first direction X and reflects the third color laser beam exiting from the third laser-exit region 123 to the polarization direction adjustment component 103. In this way, the laser beams of different colors exiting from the plurality of laser-exit regions 120 of the first laser device 101A may be combined at the third combining lens 1023.

It will be noted that the laser beams of the plurality of colors combined by the first combining lens group 102A may have a same polarization direction. For example, the red laser beam, the green laser beam, and the blue laser beam are P-polarized light or S-polarized light. In a case where the red laser beam emitted by the first laser device 101A has a different polarization direction from the green laser beam and the blue laser beam emitted by the first laser device 101A, the polarization direction of the laser beam of one color in the laser beams of three primary colors may be adjusted, so as to make the laser beams of three primary colors have a same polarization direction, and then the laser beams of three primary colors are combined.

For example, as shown in FIGS. 8A and 8B, the laser source assembly 10 further includes a first polarization conversion component B1 located between the first laser device 101A and the first combining lens group 102A and configured to change the polarization direction of the incident laser beam. The first polarization conversion component B1 may include a half-wave plate.

The red laser beam emitted by the first laser device 101A may be a first polarized laser beam (e.g., the P-polarized light), and the blue laser beam and the green laser beam may be a second polarized laser beam (e.g., the S-polarized light). A polarization direction of the first polarized laser beam is perpendicular to a polarization direction of the second polarized laser beam. On a laser-exit surface 1011 of the first laser device 101A, an orthogonal projection of the first polarization conversion component B1 overlaps with the laser-exit regions corresponding to the blue laser beam and the green laser beam (e.g., the first laser-exit region 121 and the second laser-exit region 122). The blue laser beam and the green laser beam emitted by the first laser device 101A are converted into the first polarized laser beam by the first polarization conversion component B1 and are then incident on the first combining lens group 102A. The red laser beam emitted by the first laser device 101A may be directly incident on the first combining lens group 102A. In this way, the laser beams of the plurality of colors incident on the first combining lens group 102A have a same polarization direction, which may improve the light combining effect of the laser beams of different colors.

An optical component (e.g., a lens) has a same transmittance or reflectivity for the laser beams with a same polarization direction. Therefore, in a case where the laser beams of three primary colors with a same polarization direction pass through the first combining lens group 102A, the uniformity of the laser beams is good, and the light loss is less, which is conducive to improving the display effect of the projection image. Of course, the laser beams of the plurality of colors may also have different polarization directions after being combined by the first combining lens group 102A, For example, in the combined laser beams of the plurality of colors, the polarization direction of the laser beam of one color is different from that of laser beams of other colors.

The polarization direction adjustment component 103 is located on a laser-exit side of the first combining lens group 102A and configured to adjust the polarization direction of at least a portion of the incident laser beams, so as to obtain a target laser beam.

Here, the target laser beam refers to the laser beams in a beam path after the polarization direction adjustment component 103. A laser beam of at least one color in the target laser beams satisfies that, a polarization direction of a portion of the laser beam of a same color is different from a polarization direction of another portion of the laser beam of the same color. That is to say, a laser beam of a same color in the laser beam of at least one color at least includes a first portion laser beam and a second portion laser beam, a polarization direction of the first portion laser beam is different from a polarization direction of the second portion laser beam, and the laser beam of a same color in the laser beam of at least one color has different polarization directions. In some embodiments, the laser beam of a same color in the laser beam of at least one color may also include three portions, and the three portions of the laser beam of a same color have different polarization directions.

In some embodiments, the laser beam of at least one color in the target laser beam may include the laser beams of the plurality of colors emitted by the first laser device 101A, and the polarization direction adjustment component 103 may be configured to adjust the polarization direction of a portion of the laser beam of each color. The laser beams of the plurality of colors form a combined beam spot after the laser beams of the plurality of colors emitted by the first laser device 101A are combined by the first combining lens group 102A. In a case where the laser beams of the plurality of colors may be uniformly combined by the first combining lens group 102A, the laser beams of the plurality of colors may be at each position of the combined beam spot.

After the laser beams of the plurality of colors are incident on the polarization direction adjustment component 103, a portion of the combined beam spot may be irradiated on the polarization direction adjustment component 103, and the remaining portion of the combined beam spot may be outside the polarization direction adjustment component 103. The laser beams corresponding to the remaining portion of the combined beam spot do not pass through the polarization direction adjustment component 103. In this case, the polarization direction adjustment component 103 may adjust the polarization direction of a portion of the laser beam of each color in the laser beams of the plurality of colors in the combined beam spot, so that the laser beam of each color may have different polarization directions.

In some embodiments, the polarization direction adjustment component 103 may include any one of a half-wave plate, a quarter-wave plate, and a three-quarter-wave plate.

In some examples, the polarization direction adjustment component 103 includes the half-wave plate. The laser beams of the plurality of colors emitted by the first laser device 101A each are linearly polarized light, such as P-polarized light or S-polarized light. Therefore, the half-wave plate may deflect the polarization directions of the laser beams incident on the half-wave plate by 90°.

In this way, in the laser beams of the combined beam spot, after a portion of the laser beams passes through the half-wave plate, the polarization direction of the portion of the laser beams is deflected by 90° relative to the another portion of the laser beams. Moreover, for the combined beam spot formed by the laser beams of the plurality of colors, the polarization directions of the laser beams corresponding to the portion of the combined beam spot may be different from the polarization directions of the laser beams corresponding to the remaining portion of the combined beam spot. Since the combined beam spot is formed by uniformly combining the laser beams of the plurality of colors, the laser beam of each color of the laser beams of the plurality of colors corresponding to the combined beam spot may have different polarization directions. In this way, coherence of laser beams of a same color may be reduced, which may be conducive to reducing the speckle phenomenon during projection imaging.

It will be noted that in a case where the first laser device 101A includes a multi-color laser device, the half-wave plate may be provided according to a wavelength of the laser beam of one color in the laser beams of the plurality of colors. Therefore, the polarization direction of the laser beam of one color corresponding to the half-wave plate may be deflected by 90°, while the polarization directions of laser beams of other colors may be deflected by approximately 90°. The half-wave plate may still make different portions of the laser beam of a same color have different polarization directions.

For example, in a case where the laser beams of the plurality of colors are the red laser beam, the green laser beam, and the blue laser beam, the half-wave plate may be provided according to the wavelength of the green laser beam or the red laser beam, so as to reduce the speckle phenomenon, Here, since the human eyes have low sensitivity to blue light, by providing the half-wave plate according to the wavelength of the green laser beam or the red laser beam, it is possible to significantly reduce the speckle phenomenon and improve the display effect of the projection image. Of course, the half-wave plate may also be provided according to the wavelength of the blue laser beam.

In addition, the half-wave plate may also be provided according to a median wavelength of the laser beams of two colors in the laser beams of the plurality of colors, so as to adjust the polarization direction of a portion of the laser beams of three primary colors passing through the polarization direction adjustment component 103, Moreover, the laser beams of different colors are adjusted at different spatial phases by the polarization direction adjustment component 103. Here, the median wavelength may be an average between two wavelengths of the laser beams of two colors.

In some other examples, the polarization direction adjustment component 103 includes the quarter-wave plate. The quarter-wave plate may adjust the incident laser beams into circularly polarized light or elliptically polarized light. Alternatively, the polarization direction adjustment component 103 includes the three-quarter-wave plate. The three-quarter-wave plate may adjust the incident laser beams into circularly polarized light or elliptically polarized light. However, a spatial phase of the laser beam adjusted by the three-quarter-wave plate differs by 90° from a spatial phase of the laser beam adjusted by the quarter-wave plate.

In some embodiments, the polarization direction adjustment component 103 may further include at least two of a transparent material, the half-wave plate, the quarter-wave plate, or the three-quarter-wave plate. That is to say, the polarization direction adjustment component 103 may be combined by at least two of the transparent material, the half-wave plate, the quarter-wave plate, or the three-quarter-wave plate. In this way, the laser beams of a same color incident on different regions of the polarization direction adjustment component 103 are adjusted by different spatial phases, so that the laser beams of a same color may have different polarization directions.

It will be noted that, in a case where a laser beam of one color in the laser beams incident on the polarization direction adjustment component 103 has a different polarization direction from the laser beams of other colors in the laser beams incident on the polarization direction adjustment component 103, the polarization direction adjustment component 103 may be configured to adjust the polarization direction of the laser beam corresponding to a portion of the combined beam spot, so that different portions of laser beam of one color may have different polarization directions.

In the laser source assembly 10 provided in some embodiments of the present disclosure, the laser beams of the plurality of colors emitted by the first laser device 101A may be incident on the polarization direction adjustment component 103 after being combined, and the polarization direction adjustment component 103 may adjust the polarization direction of at least a portion of the incident laser beams, so that the laser beam of a same color in the laser beams of the plurality of colors may have different polarization directions. In this way, it is possible to reduce coherence of the laser beams of the plurality of colors emitted by the laser source assembly 10, and reduce the speckle phenomenon caused by the projection of the laser beams, and improve the projection effect of the projection apparatus 1000.

A plurality of arrangements of the polarization direction adjustment component 103 are described below by considering an example in which the first laser device 101A includes the structure of the first laser device 101A, as shown in FIGS. 8A and 9A.

In some embodiments, referring to FIG. 8A, on a plane perpendicular to the first direction X, an orthogonal projection of the polarization direction adjustment component 103 partially overlaps with an orthogonal projection of the first combining lens group 102A, and the polarization direction adjustment component 103 is disposed in a propagation path of a portion of the laser beams exiting from the first combining lens group 102A, so that the portion of the laser beams exiting from the first combining lens group 102A may be incident on the polarization direction adjustment component 103. The polarization direction adjustment component 103 may adjust the polarization direction of the portion of the laser beams. Here, a beam spot provided by the laser beams exiting from the first combining lens group 102A corresponds to the combined beam spot obtained by combining the laser beams of the plurality of colors emitted by the first laser device 101A.

In some examples, a laser-exit direction of the first combining lens group 102A is parallel to the first direction X. On the plane perpendicular to the first direction X, the orthogonal projection of the polarization direction adjustment component 103 overlaps with a partial region of the combined beam spot. For example, on the plane perpendicular to the first direction X, the orthogonal projection of the polarization direction adjustment component 103 overlaps with half or one-third of the combined beam spot. However, the present disclosure is not limited thereto.

In some embodiments, referring to FIG. 8B, on the plane perpendicular to the first direction X, the orthogonal projection of the polarization direction adjustment component 103 overlaps with the orthogonal projection of the first combining lens group 102A, and the polarization direction adjustment component 103 is disposed in propagation paths of all laser beams exiting from the first combining lens group 102A. In this way, all the laser beams exiting from the first combining lens group 102A may be incident to the polarization direction adjustment component 103. In some examples, the laser-exit direction of the first combining lens group 102A is parallel to the first direction X, and on the plane perpendicular to the first direction X, the orthogonal projection of the polarization direction adjustment component 103 overlaps with the combined beam spot formed by the laser beams exiting from the first combining lens group 102A.

In the beam path shown in FIG. 8B, although the polarization direction adjustment component 103 is irradiated by all the laser beams exiting from the first combining lens group 102A, the polarization direction adjustment component 103 may still be configured to change the polarization direction of a portion of the laser beams, or to perform adjustment with different spatial phases on the portions of laser beams of different colors.

Figure 10:
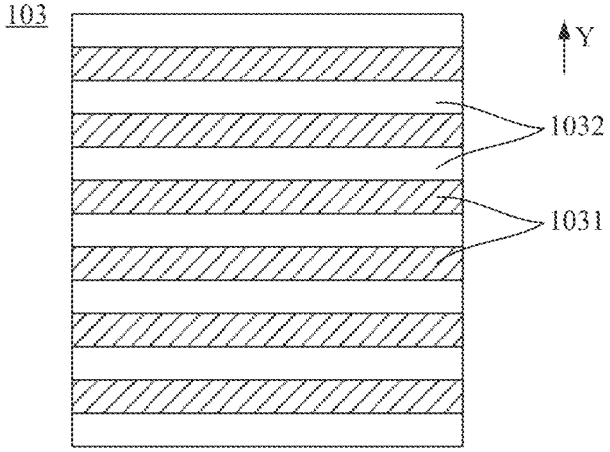
FIG. 10 is a diagram showing a structure of a polarization direction adjustment component, in accordance with some embodiments.

FIG. 10 is a diagram showing a structure of a polarization direction adjustment component, in accordance with some embodiments.

For example, as shown in FIG. 10, the polarization direction adjustment component 103 includes a first portion 1031 and a second portion 1032. In a second direction Y, the first portion 1031 and the second portion 1032 are alternately arranged and configured to adjust the laser beam of a same color by different spatial phases, so that different portions of the laser beam of a same color may have different polarization directions. In this way, the laser beams of the plurality of colors exiting from the first combining lens group 102A may be adjusted by different spatial phases through the first portion 1031 and the second portion 1032, so that the laser beams with different polarization directions in the laser beams of a same color may be uniformly distributed, thereby further reducing coherence of the laser beams with a same color and reducing the speckle phenomenon. Here, the second direction Y is perpendicular to the first direction X.

Of course, in addition to the first portion 1031 and the second portion 1032, the polarization direction adjustment component 103 may further include a third portion, and the first portion 1031, the second portion 1032, and the third portion may be alternately arranged in sequence. The first portion 1031, the second portion 1032, and the third portion each may be made of any one of a transparent material (e.g., glass), a half-wave plate, a quarter-wave plate, and a three-quarter-wave plate, and different portions correspond to different materials. For example, the first portion 1031, the second portion 1032, and the third portion are wave plates and correspond to the wavelengths of the first color laser beam, the second color laser beam, and the third color laser beam, respectively.

Alternatively, in addition to the first portion 1031 and the second portion 1032, the polarization direction adjustment component 103 may further include a third portion and a fourth portion, and the first portion, the second portion, the third portion, and the fourth portion may be alternately arranged in sequence. The first portion, the second portion, the third portion, and the fourth portion each may be made of any one of a transparent material, a half-wave plate, a quarter-wave plate, and a three-quarter-wave plate, and different portions correspond to different materials. In this way, the laser beam of each color exiting from the polarization direction adjustment component 103 may have three or four polarization directions.

In some embodiments, the polarization direction adjustment component 103 may include a plurality of first portions 1031 and a plurality of second portions 1032, and the numbers of the plurality of first portions 1031 and the plurality of second portions 1032 each are greater than a preset threshold.

In some embodiments, an area of the first portion 1031 is equal to an area of the second portion 1032, Alternatively, in a case where the polarization direction adjustment component 103 includes the plurality of first portions 1031 and the plurality of second portions 1032, an area of the plurality of first portions 1031 is equal to an area of the plurality of second portions 1032, and the number of the plurality of first portions 1031 is equal to the number of the plurality of second portions 1032. In this case, in the laser beams of a same color, the amount of laser beams passing through the first portion 1031 and the amount of laser beams passing through the second portion 1032 are the same, and the uniformity of the laser beams passing through the polarization direction adjustment component 103 is good. It will be noted that, the smaller the areas of different portions of the polarization direction adjustment component 103, the better the uniformity of distribution of laser beams with different polarization directions in the laser beams of a same color.

In some embodiments, the first portion 1031 may be any one of a half-wave plate, a quarter-wave plate, and a three-quarter-wave plate. The second portion 1032 may be made of a transparent material, or the second portion 1032 may be any one of a half-wave plate, a quarter-wave plate, and a three-quarter-wave plate that is different from the first portion 1031. For example, the first portion 1031 and the second portion 1032 include any two of the half-wave plate, the quarter-wave plate, or the three-quarter-wave plate.

In a case where the second portion 1032 is made of a transparent material, the polarization direction of the laser beam passing through the second portion 1032 remains unchanged. In this case, only the first portion 1031 adjusts the polarization direction of the incident laser beam. In this way, in a case where the areas of the first portion 1031 and the second portion 1032 are equal to each other, the polarization direction adjustment component 103 adjusts the polarization direction of half of the incident laser beams, so that the laser beam of each color in the target laser beam may have different polarization directions.

In a case where the second portion 1032 is a wave plate, the polarization directions of all laser beams incident on the polarization direction adjustment component 103 are adjusted, and the polarization direction of the laser beam of each color may be adjusted by different portions (e.g., the first portion 1031 or the second portion 1032) of the polarization direction adjustment component 103, so that the laser beam of each color in the target laser beam may have different polarization directions.

For example, the first portion 1031 is a half-wave plate, and the second portion 1032 is made of a transparent material. Alternatively, the first portion 1031 is a quarter-wave plate, and the second portion 1032 is a three-quarter-wave plate. In this way, after the polarization direction of the laser beam of a same color is adjusted by the first portion 1031 and the second portion 1032, a difference between the two polarization directions of the laser beam of the color is greatest, and the two polarization directions may differ by 90°, thereby minimizing the coherence of the laser beams.

In some embodiments, the polarization direction adjustment component 103 may be fixedly disposed or may be movably disposed. For example, the polarization direction adjustment component 103 rotates along an axis that passes through a center point of the polarization direction adjustment component 103 and is parallel to the first direction X. In this way, by providing the movable polarization direction adjustment component 103, the laser beam may be incident on different positions of the polarization direction adjustment component 103 at different moments, so that the polarization direction of a portion of the laser beams may be changed, or the adjustment on the polarization directions of portions of laser beams of different colors may be performed with different spatial phases.

The above description is mainly given by considering an example in which the laser source assembly 10 includes one laser device. Of course, in some embodiments, the laser source assembly 10 may also include a plurality of laser devices.

Figure 11A:
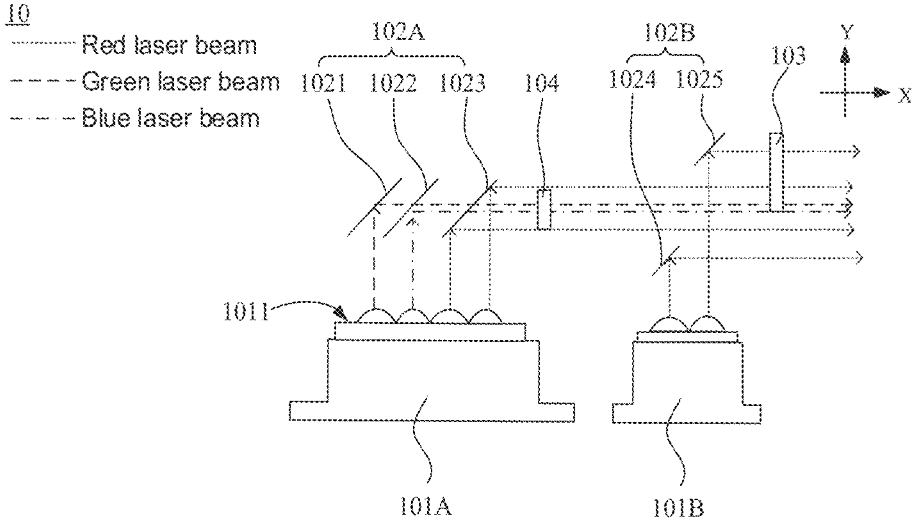
FIG. 11A is a diagram showing a structure of yet another laser source assembly, in accordance with some embodiments.

FIG. 11A is a diagram showing a structure of yet another laser source assembly, in accordance with some embodiments. As shown in FIG. 11A, the laser source assembly 10 includes a first laser device 101A and a second laser device 101B. The first laser device 101A is a multi-color laser device. For example, the first laser device 101A is the first laser device 101A shown in FIGS. 8A and 8B. The second laser device 101B is a single-color laser device. For example, the second laser device 101B is a red laser device emitting the red laser beam. In this way, by providing two laser devices (e.g., the first laser device 101A and the second laser device 101B), it is possible to provide the laser beams required for the projection image, thereby improving the display luminance and color balance of the projection image.

In this case, the laser source assembly 10 further includes a first combining lens group 102A and a second combining lens group 102B.

The first combining lens group 102A, the second combining lens group 102B, and the polarization direction adjustment component 103 may be sequentially arranged in the first direction X. The first combining lens group 102A is located on a laser-exit side of the first laser device 101A, and the second combining lens group 102B is located on a laser-exit side of the second laser device 101B. An arrangement direction of the first laser device 101A and the first combining lens group 102A and an arrangement direction of the second laser device 101E and the second combining lens group 102B are each perpendicular to the first direction X. For example, the arrangement direction of the first laser device 101A and the first combining lens group 102A and the arrangement direction of the second laser device 101B and the second combining lens group 102B are each the second direction Y.

Of course, in some examples, the arrangement direction of the first laser device 101A and the first combining lens group 102A may be different from the arrangement direction of the second laser device 101B and the second combining lens group 102B. For example, the arrangement direction of the first laser device 101A and the first combining lens group 102A may be opposite, perpendicular, or at a preset angle to the arrangement direction of the second laser device 101B and the second combining lens group 102B.

The first laser device 101A is configured to emit the laser beams of a plurality of colors (e.g., the first color laser beam, the second color laser beam, and the third color laser beam) to the first combining lens group 102A, and the first combining lens group 102A is configured to combine the incident laser beams of a plurality of colors and propagate the combined laser beams to the polarization direction adjustment component 103 in the first direction X. It will be noted that, for the structures and functions of the first laser device 101A and the first combining lens group 102A, reference may be made to the related content of the first laser device 101A and the first combining lens group 102A described above, and details will not be repeated herein.

The second laser device 101B is configured to emit a laser beam of any one color (e.g., the red laser beam) of the laser beams of a plurality of colors to the second combining lens group 102B, and the second combining lens group 102B is configured to propagate the incident laser beam to the polarization direction adjustment component 103 in the first direction X. In this way, the laser beams emitted by the first laser device 101A and the second laser device 101B may be combined at the second combining lens group 102B.

For example, a lens of the second combining lens group 102B transmits the blue laser beam and the green laser beam and reflects the red laser beam. Alternatively, the lens of the second combining lens group 1028 reflects the laser beams of all colors, and on the plane perpendicular to the first direction X, an orthogonal projection of the second combining lens group 102B is separated from the orthogonal projection of the first combining lens group 102A. For example, as shown in Fla 11A, the second combining lens group 102B includes a fourth combining lens 1024 and a fifth combining lens 1025. On the plane perpendicular to the first direction X, orthogonal projections of the fourth combining lens 1024 and fifth combining lens 1025 are located on two sides of the orthogonal projection of the first combining lens group 102A, respectively. Of course, the second combining lens group 1028 may further include one of the fourth combining lens 1024 and the fifth combining lens 1025, and the present disclosure is not limited thereto.

In this way, the red laser beam in the laser beams of a plurality of colors exiting from the first combining lens group 102A may irradiate outside the lenses of the second combining lens group 102B, which may prevent the second combining lens group 102B from blocking the red laser beam.

The red laser beam emitted by the second laser device 101B may be divided into two laser beams after being reflected by the second combining lens group 102B, and the two laser beams are located on two sides of the laser beams exiting from the first combining lens group 102A, respectively, thereby preventing the second combining lens group 102B from blocking the laser beams exiting from the first combining lens group 102A.

FIG. 11A is illustrated by considering an example in which on the plane perpendicular to the first direction X, the orthogonal projection of the polarization direction adjustment component 103 overlaps with a portion of the combined beam spot of the combined laser beams away from the second laser device 101B.

Of course, in some embodiments, on the plane perpendicular to the first direction X, the orthogonal projection of the polarization direction adjustment component 103 overlaps with a portion of the combined beam spot of the combined laser beams proximate to the second laser device 101B. Alternatively, on the plane perpendicular to the first direction X, the orthogonal projection of the polarization direction adjustment component 103 overlaps with a middle portion of the combined beam spot of the combined laser beams, and half of the combined laser beams may pass through the polarization direction adjustment component 103. For example, the polarization direction adjustment component 103 is located in the middle of the combined laser beams, and half of the combined laser beams may pass through the polarization direction adjustment component 103, Of course, the polarization direction adjustment component 103 may also be disposed in the position shown in FIG. 8B.

In some embodiments, referring to FIG. 11A, the laser source assembly 10 further includes a beam expanding component 104 located between the first combining lens group 102A and the second combining lens group 102B and configured to diverge the blue laser beam and the green laser beam exiting from the first combining lens group 102A. In the laser beams emitted by the first combining lens group 102A, at least the blue laser beam and green laser beam pass through the beam expanding component 104, For example, the blue laser beam and the green laser beam exiting from the first combining lens group 102A may be incident on the beam expanding component 104, and then incident on the polarization direction adjustment component 103 after being diverged by the beam expanding component 104, The beam expanding component 104 may include a diffuser, a fly-eye lens, or a diffractive optical element.

Of course, in some embodiments, a red laser beam located outside the blue laser beam and green laser beam in the laser beams exiting from the first combining lens group 102A may not pass through the beam expanding component 104. Alternatively, all of the laser beams exiting from the first combining lens group 102A may pass through the beam expanding component 104.

Since a lot of red laser beams are required when the projection image is displayed, the first laser device 101A may include a lot of red light-emitting chips to emit a lot of red laser beams, so that the beam of the red laser beams emitted by the first laser device 101A is thicker than one of the beam of the blue laser beams and the beam of the green laser beams, and a beam spot of the red laser beams on the first combining lens group 102A is larger than beam spots of the blue laser beams and the green laser beams.

In this case, after the laser beams of a plurality of colors emitted by the first laser device 101A are combined by the first combining lens group 102A, the blue laser beam and the green laser beam are substantially distributed in the center of the combined laser beams, and a periphery of the combined beam spot formed by the combined laser beams is reddish. In order to solve the above problem, in the laser source assembly 10 provided by some embodiments of the present disclosure, by using the beam expanding component 104 to expand the beams of the blue laser beams and the green laser beams exiting from the first combining lens group 102A, it is possible to reduce a size difference between the beam spot of the blue laser beams and green laser beams and the beam spot of the red laser beams, so as to improve the uniformity of the combined laser beams.

Of course, in some embodiments, the beam expanding component 104 may also be located between the first laser device 101A and the first combining lens group 102A. Moreover, on the laser-exit surface 1011 of the first laser device 101A, an orthogonal projection of the beam expanding component 104 overlaps with at least one of the first laser-exit region 121 or the second laser-exit region 122, so as to reduce the size difference between the beam spots of the laser beams of a plurality of colors incident on the first combining lens group 102A.

Figure 11B:
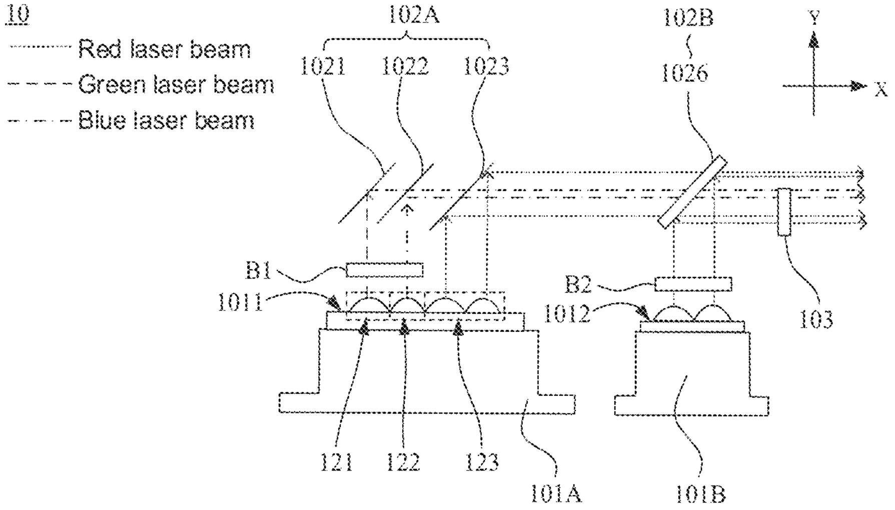
FIG. 11B is a diagram showing a structure of yet another laser source assembly, in accordance with some embodiments.

FIG. 11B is a diagram showing a structure of yet another laser source assembly, in accordance with some embodiments.

In some embodiments, as shown in FIG. 11B, the second combining lens group 102B includes a polarization beam splitter (PBS) 1026 formed by connecting (e.g., bonding to) a pair of high-precision right-angle prisms. Surfaces where inclined sides of the two right-angle prisms are located are bonded to each other, and the surface where the inclined side of one right-angle prism is located is provided with a polarization beam splitting medium film. The polarization beam splitter 1026 is configured to transmit the incident first polarized laser beam and reflect the incident second polarized laser beam. Here, the polarization direction of the first polarized laser beam is perpendicular to the polarization direction of the second polarized laser beam.

In this case, the first combining lens group 102A, the polarization beam splitter 1026, and the polarization direction adjustment component 103 may be sequentially arranged in the first direction X. On the plane perpendicular to the first direction X, an orthogonal projection of the polarization beam splitter 1026 completely overlaps with the orthogonal projection of the first combining lens group 102A. For the structures of the first laser device 101A, the second laser device 101B, and the first combining lens group 102A, reference may be made to the relevant content described above, and details will not be repeated herein.

As shown in FIG. 11B, the laser source assembly 10 further includes a first polarization conversion component B1 and a second polarization conversion component B2. The first polarization conversion component B1 is located between the first laser device 101A and the first combining lens group 102A and configured to adjust the polarization direction of the incident laser beams. For example, the first polarization conversion component B1 is located between the first combining lens 1021 and the first laser device 101A and between the second combining lens 1022 and the first laser device 101A. On the laser-exit surface 1011 of the first laser device 101A, an orthogonal projection of the first polarization conversion component B1 overlaps with the laser-exit regions (e.g., the first laser-exit region 121 and the second laser-exit region 122) corresponding to the first color laser beam and the second color laser beam.

In this way, the first polarization conversion component B1 may convert the blue laser beam and the green laser beam that are the second polarized laser beams and emitted by the first laser device 101A into the first polarized laser beams. The red laser beam emitted by the first laser device 101A is directly incident on the first combining lens group 102A, so that the laser beams received by the first combining lens group 102A and exiting from the first combining lens group 102A may be the first polarized laser beams.

The second polarization conversion component B2 is located between the second laser device 101B and the second combining lens group 102E and configured to adjust the polarization direction of the incident laser beam. On a laser-exit surface 1012 of the second laser device 101B, an orthogonal projection of the second polarization conversion component B2 overlaps with the laser-exit surface 1012 of the second laser device 101B. In a case where the second laser device 101B emits the first polarized laser beam (e.g., the red laser beam) to the polarization beam splitter 1026, the first polarized laser beam may be converted into the second polarized laser beam after passing through the second polarization conversion component B2 and be incident on the polarization beam splitter 1026.

In this way, in the laser beams received by the polarization beam splitter 1026, the laser beams from the first combining lens group 102A are the first polarized laser beams, and the laser beams from the second laser device 101B are the second polarized laser beams. The polarization beam splitter 1026 may transmit the incident first polarized laser beams to the polarization direction adjustment component 103 in the first direction X, and reflect the incident second polarized laser beams to the polarization direction adjustment component 103 in the first direction X. The laser beams emitted by the first laser device 101A and the second laser device 101B are combined at the polarization beam splitter 1026.

In some embodiments, the first polarization conversion component 31 and the second polarization conversion component B2 each include a half-wave plate.

FIG. 11B is illustrated by considering an example in which on the plane perpendicular to the first direction X, the orthogonal projection of the polarization direction adjustment component 103 overlaps with a portion of the combined beam spot of the combined laser beams proximate to the second laser device 101B. Of course, in some embodiments, on the plane perpendicular to the first direction X, the orthogonal projection of the polarization direction adjustment component 103 may also overlap with a portion of the combined beam spot of the combined laser beams away from the second laser device 101B. Alternatively, on the plane perpendicular to the first direction X, the orthogonal projection of the polarization direction adjustment component 103 may also overlap with a middle portion of the combined beam spot of the combined laser beams, and half of the combined laser beams may pass through the polarization direction adjustment component 103. Of course, the polarization direction adjustment component 103 may also be disposed in the position shown in FIG. 8B.

The above description is mainly given by considering an example in which the laser source assembly 10 includes a multi-color laser device. Of course, the laser source assembly 10 in some embodiments of the present disclosure may also use a plurality of single-color laser devices to provide the laser beams of a plurality of colors.

Figure 12:
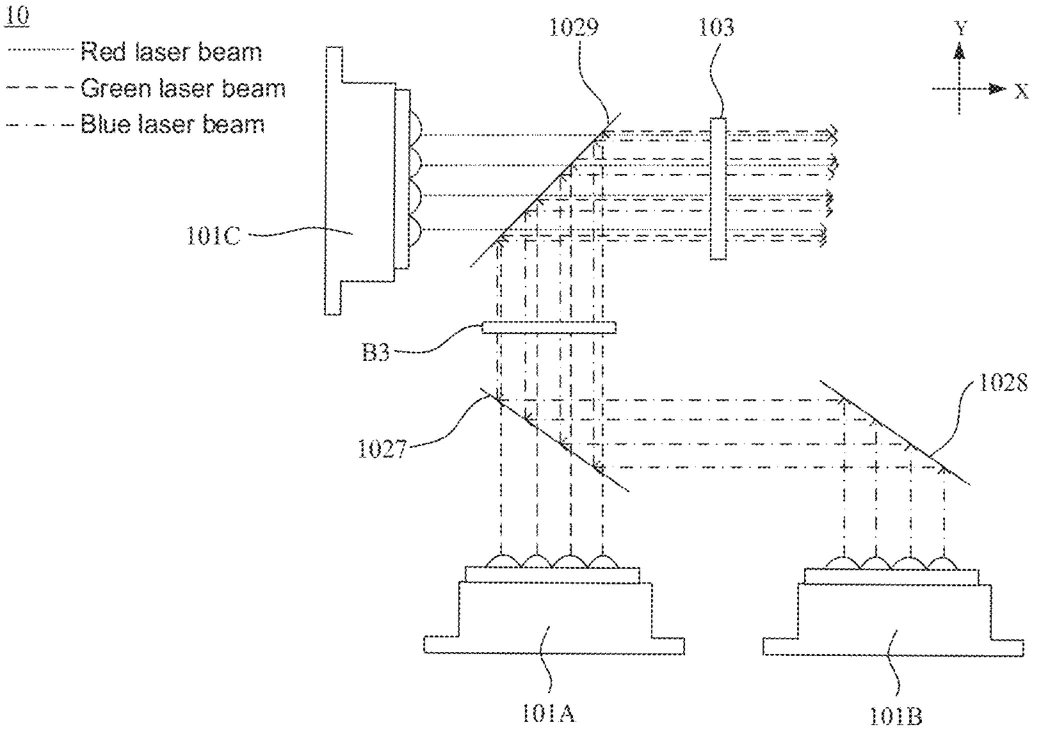
FIG. 12 is a diagram showing a structure of yet another laser source assembly, in accordance with some embodiments.

FIG. 12 is a diagram showing a structure of yet another laser source assembly, in accordance with some embodiments. As shown in FIG. 12, the laser source assembly 10 includes a first laser device 101A, a second laser device 101B, a third laser device 101C, a first combining sub-lens 1027, a second combining sub-lens 1028, and a third combining sub-lens 1029.

The third laser device 101C, the third combining sub-lens 1029, and the polarization direction adjustment component 103 may be sequentially arranged in the first direction X. The first laser device 101A, the first combining sub-lens 1027, and the third combining sub-lens 1029 are sequentially arranged in the second direction Y. The first combining sub-lens 1027 and the second combining sub-lens 1028 are sequentially arranged in the first direction X. The second laser device 101B and the second combining sub-lens 1028 are sequentially arranged in the second direction Y.

The first laser device 101, is configured to emit the first color laser beam (e.g., the green laser beam) to the first combining sub-lens 1027, and the second laser device 101B is configured to emit the second color laser beam (e.g., the blue laser beam) to the second combining sub-lens 1028, and the third laser device 101C is configured to emit the third color laser beam (e.g. the red laser beam) to the third combining sub-lens 1029.

The second combining sub-lens 1028 is located on a laser-exit side of the second laser device 101B and configured to reflect the incident second color laser beam to the first combining sub-lens 1027 in an opposite direction of the first direction X. The first combining sub-lens 1027 is located on a laser-exit side of the first laser device 101A and configured to transmit the incident first color laser beam to the third combining sub-lens 1029 and reflect the incident second color laser beam to the third combining sub-lens 1029.

The third combining sub-lens 1029 is located on a laser-exit side of the third laser device 101C and is configured to transmit the incident third color laser beam to the polarization direction adjustment component 103 in the first direction X and reflect the incident first color laser beam and second color laser beam to the polarization direction adjustment component 103 in the first direction X. In this way, the laser beams of three colors emitted by the three laser devices may be combined at the third combining sub-lens 1029.

It will be noted that the first laser device 101A, the second laser device 101B, and the third laser device 101C may also emit the second color laser beam, the third color laser beam, and the first color laser beam, respectively, as long as the laser beams of a plurality of colors emitted by the first laser device 101A, the second laser device 101B, and the third laser device 101C may form a white beam.

In some embodiments, the first combining sub-lens 1027 and the second combining sub-lens 1028 may also be sequentially arranged in the opposite direction of the first direction X. Alternatively, a plurality of combining sub-lenses may also be arranged in other manners, as long as the laser beams of three colors emitted by the three laser devices may be combined after passing through a combining sub-lens.

FIG. 12 is illustrated by considering an example in which on the plane perpendicular to the first direction X, the orthogonal projection of the polarization direction adjustment component 103 overlaps with the combined beam spot of the combined laser beams. Of course, in FIG. 12, the polarization direction adjustment component 103 may also be disposed in a small size in the beam path of a portion of the combined laser beams. For example, on the plane perpendicular to the first direction X, the orthogonal projection of the polarization direction adjustment component 103 overlaps with a portion of the combined beam spot of the combined laser beams proximate to or away from the first laser device 101A. Alternatively, on the plane perpendicular to the first direction X, the orthogonal projection of the polarization direction adjustment component 103 overlaps with a middle portion of the combined beam spot of the combined laser beams, and half of the combined laser beams may pass through the polarization direction adjustment component 103.

In some embodiments, referring to FIG. 12, the laser source assembly 10 further includes a third polarization conversion component B3 located between the first combining sub-lens 1027 and the third combining sub-lens 1029 and configured to adjust the polarization direction of the incident laser beams. For example, the third polarization conversion component B3 converts the blue laser beam and the green laser beam exiting from the first combining sub-lens 1027 from the second polarized laser beams into the first polarized laser beams and then propagates the converted first polarized laser beams to the third combining sub-lens 1029. In this way, the laser beams of a plurality of colors incident on the third combining sub-lens 1029 may have a same polarization direction, thereby improving the uniformity of the combined laser beams.

The above description is mainly given by considering an example in which the laser device is as shown in FIG. 9A. Of course, in some embodiments, the first laser device 101A and the second laser device 101B may also be as the structure of the laser device shown in FIGS. 9B and 9C.

Figure 13:
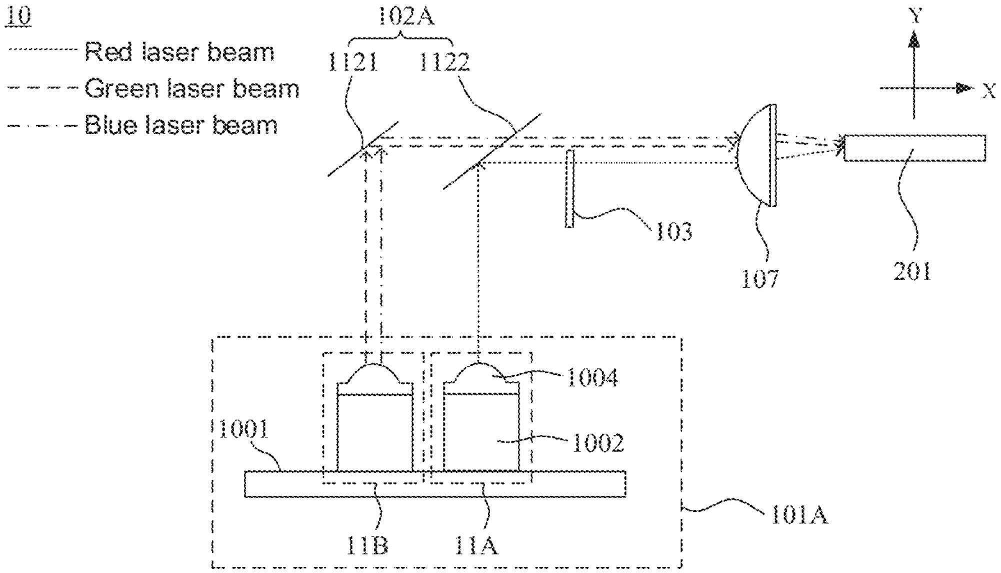
FIG. 13 is a diagram showing a structure of yet another laser source assembly, in accordance with some embodiments.

FIG. 13 is a diagram showing a structure of yet another laser source assembly, in accordance with some embodiments. As shown in FIG. 13, the laser source assembly 10 includes a first laser device 101A, a first combining lens group 102A, and a polarization direction adjustment component 103.

The first laser device 101A includes a first light-emitting component 11A and a second light-emitting component 11B, The first light-emitting component 11A is configured to emit the third color laser beam (e.g., the red laser beam), and the second light-emitting component 11B is configured to emit the first color laser beam (e.g., the green laser beam) and the second color laser beam (e.g., the blue laser beam). Here, for the structures of the first light-emitting component 11A and the second light-emitting component 11B, reference may be made to the relevant content described above, and details will not be repeated herein. The first combining lens group 102A is located on the laser-exit side of the first laser device 101A and configured to combine the laser beams of a plurality of colors emitted by the first laser device 101A and propagate the combined laser beams in the first direction X.

For example, referring to FIG. 13, the first combining lens group 102A includes a fourth combining sub-lens 1121 and a fifth combining sub-lens 1122. The fourth combining sub-lens 1121 is located on a laser-exit side of the second light-emitting component 11B and configured to reflect the incident laser beams (e.g., the first color laser beam and the second color laser beam). The fifth combining sub-lens 1122 is located on a laser-exit side of the first light-emitting component 11A and configured to reflect the incident third color laser beam and transmit the first color laser beam and the second color laser beam. In this way, the laser beams of a plurality of colors may be combined at the fifth combining sub-lens 1122.

The polarization direction adjustment component 103 is located on the laser-exit side of the first combining lens group 102A and disposed in the beam path of the first color laser beam, the second color laser beam, and the third color laser beam that are combined. Moreover, the polarization direction adjustment component 103 is configured to adjust the polarization direction of a portion of the combined laser beams. Here, the polarization direction adjustment component 103 may also be located in the beam path of a portion of the combined laser beams. For the position of the polarization direction adjustment component 103, reference may be made to the relevant content described above, and details will not be repeated herein.

The above description is mainly given by considering an example in which the polarization direction adjustment component 103 is located in the beam path of the combined laser beams. Of course, the present disclosure is not limited thereto. In some embodiments, the polarization direction adjustment component 103 may also be located on a laser-exit side of the corresponding laser device. In this case, the laser beam of at least one color of the target laser beam may include the laser beams of one, two, or all colors in the laser beams of a plurality of colors.

The following is described by considering an example in which the laser device is as shown in FIGS. 9B and 9C. It will be noted that, in the description below, the laser device shown in FIG. 9A is also applicable.

Figure 14A:
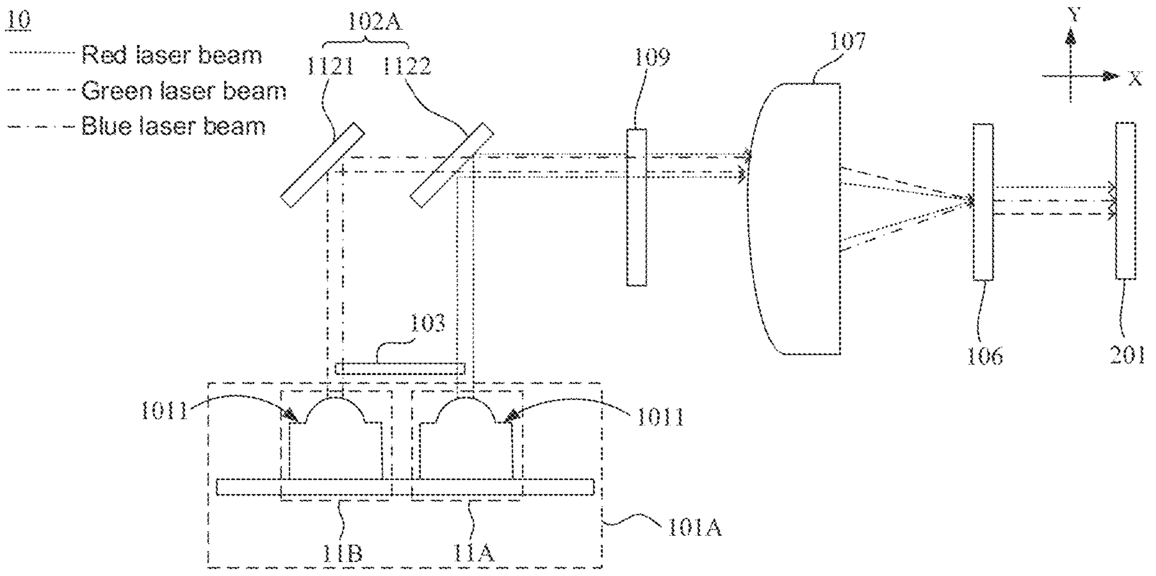
FIG. 14A is a diagram showing a structure of yet another laser source assembly, in accordance with some embodiments.
Figure 14B:
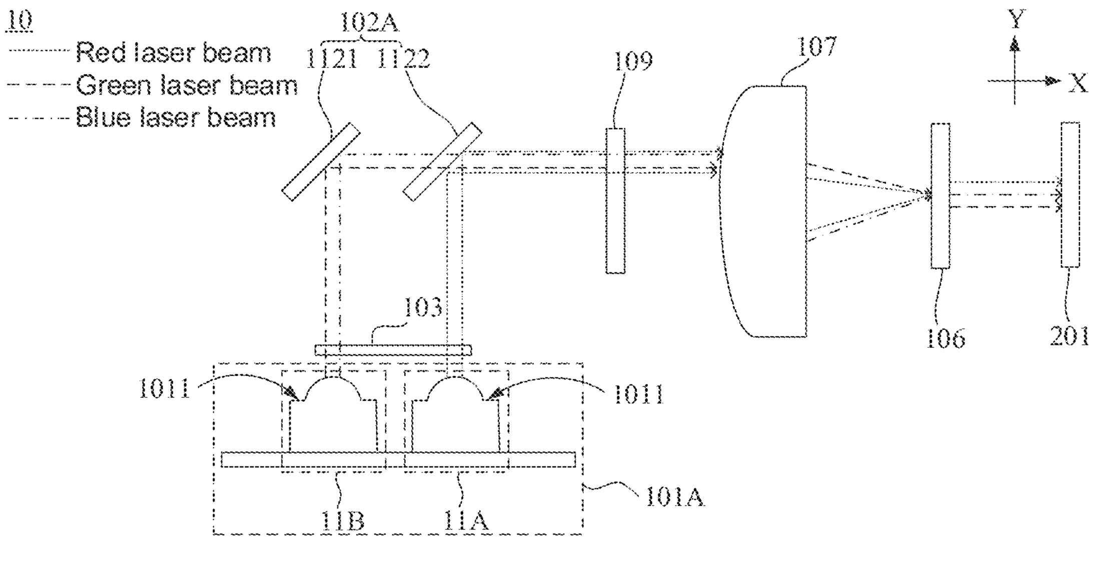
FIG. 14B is a diagram showing a structure of yet another laser source assembly, in accordance with some embodiments.
Figure 15A:
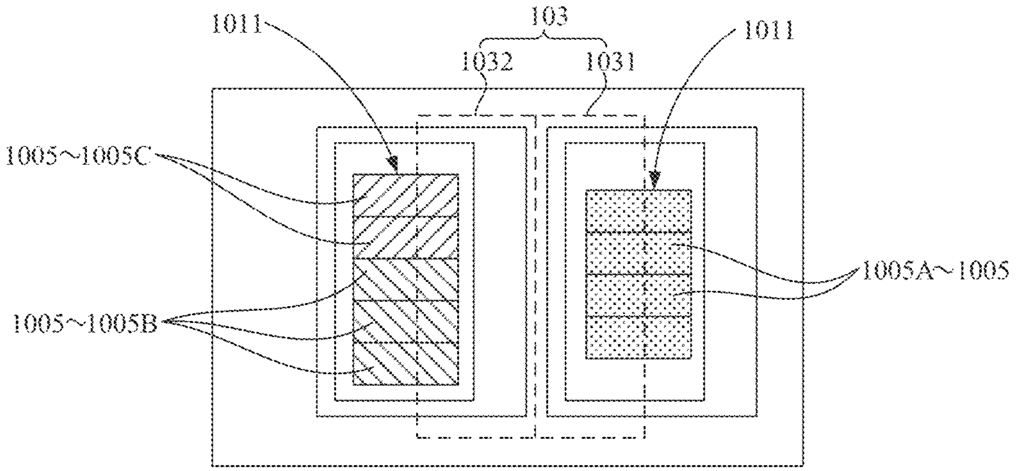
FIG. 15A is a diagram showing a structure of the polarization direction adjustment component shown in FIG. 14A.
Figure 15B:
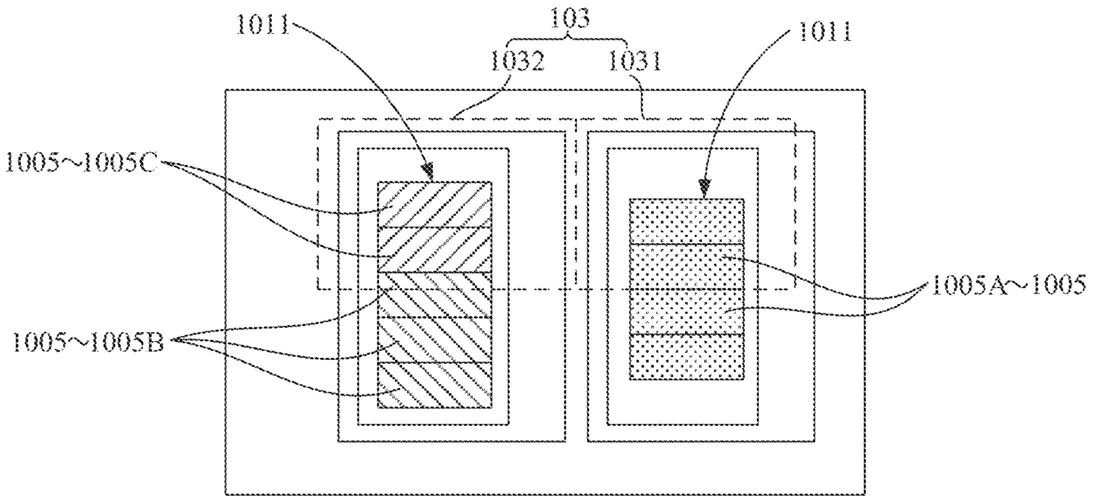
FIG. 15B is a diagram showing a structure of the polarization direction adjustment component shown in FIG. 14B.

FIG. 14A is a diagram showing a structure of yet another laser source assembly, in accordance with some embodiments. FIG. 14B is a diagram showing a structure of yet another laser source assembly, in accordance with some embodiments. The difference between FIGS. 14A and 14B is that the polarization direction adjustment component 103 has different arrangement manners on the laser-exit side of the first laser device 101A. FIG. 15A is a diagram showing a structure of the polarization direction adjustment component shown in FIG. 14A, FIG. 15B is a diagram showing a structure of the polarization direction adjustment component shown in FIG. 14B. The laser source assemblies 10 shown in FIGS. 15A and 15B each use the structure of the laser device shown in FIGS. 9B and 9C. Of course, the arrangement manners of the polarization direction adjustment component 103 shown in FIGS. 15A and 15B may also be applied to the laser device in FIG. 9A or other types of three-color laser devices.

In some embodiments, as shown in FIGS. 14A and 143, the laser source assembly 10 includes a first laser device 101A, a first combining lens group 102A, and a polarization direction adjustment component 103. For the structures and functions of the first laser device 101A and the first combining lens group 102A, reference may be made to the relevant content in FIG. 13 described above, and details will not be repeated herein. The polarization direction adjustment component 103 is located between the first laser device 101A and the first combining lens group 102A, and on the laser-exit surface 1011 of the first laser device 101A, the orthogonal projection of the polarization direction adjustment component 103 overlaps a portion of the laser-exit surface 1011 of the first laser device 101A.

In some examples, as shown in FIGS. 14A and 15A, the polarization direction adjustment component 103 overlaps approximately half of the area of the laser-exit surface 1011 of the first laser device 101A. For example, the polarization direction adjustment component 103 overlaps half of the first light-emitting chips 1005A, half of the second light-emitting chips 1005B, and half of the third light-emitting chips 1005C. The polarization direction adjustment component 103 is arranged parallel to the laser-exit surface 1011 of the first laser device 101A and extends in a direction parallel to the arrangement direction (e.g., a column direction of the plurality of light-emitting chips 1005) of the plurality of light-emitting chips 1005 in a light-emitting chip group 1003, so that the polarization direction adjustment component 103 may overlap half of the laser-exit region corresponding to the laser beams of three colors in the first laser device 101A.

For example, as shown in FIGS. 14A and 15A, the first laser device 101A includes four first light-emitting chips 1005A, three second light-emitting chips 1005B, and two third light-emitting chips 1005C, and the four first light-emitting chips 1005A are arranged in one column and four rows, and the three second light-emitting chips 1005B and two third light-emitting chips 1005C are arranged in one column and five rows.

The polarization direction adjustment component 103 includes a first portion 1031 and a second portion 1032, the first portion 1031 overlaps approximately half of the laser-exit region corresponding to the first light-emitting chips 1005A arranged in one column, and the second portion 1032 overlaps approximately half of the laser-exit region corresponding to the second light-emitting chips 1005B and third light-emitting chips 1005C arranged in one column. In this case, the polarization direction adjustment component 103 may be located in the middle of the two light-emitting chip groups 1003 and arranged in the column direction of the plurality of light-emitting chips 1005. In this way, the polarization directions of half of the red laser beam, half of the green laser beam, and half of the blue laser beam may be changed, so that the polarization direction of approximately half of the laser beam of each color in the laser beams of three colors may be changed.

In some other examples, as shown in FIGS. 14B and 15B, the polarization direction adjustment component 103 is arranged in a row direction (e.g., the first direction X) of the plurality of light-emitting chips 1005 in a light-emitting chip group 1003. The polarization direction adjustment component 103 overlaps a portion of the plurality of first light-emitting chips 1005A, all of the third light-emitting chips 1005C, and a portion of the second light-emitting chips 1005B.

For example, as shown in FIGS. 14B and 15B, the first portion 1031 of the polarization direction adjustment component 103 overlaps two rows of the first light-emitting chips 1005A, and the second portion 1032 of the polarization direction adjustment component 103 overlaps all of the third light-emitting chips 1005C and a portion of the second light-emitting chips 1005B. In a case where the third color laser beam is the first polarized laser beam, and the second color laser beam and the third color laser beam are the second polarized laser beams, half of the third color laser beam is changed in the polarization direction and becomes the second polarized laser beam after passing through the polarization direction adjustment component 103. All of the first color laser beam is changed in the polarization direction and becomes the first polarized laser beam after passing through the polarization direction adjustment component 103. A portion of the second color laser beam is changed in the polarization direction and becomes the first polarized laser beam after passing through the polarization direction adjustment component 103.

It will be noted that although the first color laser beam and the second color laser beam whose polarization directions are changed are not half of the first color laser beam and half of the second color laser beam, respectively, for the entire laser beams of three colors, different portions of the laser beam of a same color in the laser beams of three colors have different polarization directions.

Of course, in some embodiments, a size of a portion (i.e., the second portion 1032 of the polarization direction adjustment component 103) of the polarization direction adjustment component 103 corresponding to the laser-exit regions of the first color laser beam and the second color laser beam may be smaller than that of a portion (i.e., the first portion 1031 of the polarization direction adjustment component 103) of the polarization direction adjustment component 103 corresponding to the laser-exit region of the third color laser beam.

For example, the size of the second portion 1032 of the polarization direction adjustment component 103 is smaller than that of the first portion 1031 of the polarization direction adjustment component 103, and in the column direction of the plurality of light-emitting chips 1005, an end of the second portion 1032 and an end of the first portion 1031 that are located on a same side of the polarization direction adjustment component 103 are non-collinear with each other. Moreover, the first portion 1031 of the polarization direction adjustment component 103 overlaps a portion of the plurality of first light-emitting chips 1005A proximate to the middle of the plurality of first light-emitting chips 1005A, and the second portion 1032 of the polarization direction adjustment component 103 may overlap a portion of the laser-exit region corresponding to the first color laser beam and a portion of the laser-exit region corresponding to the second color laser beam.

The structure of the polarization direction adjustment component 103 in FIGS. 14A and 14B will be described in detail below.

As shown in FIGS. 15A and 15B, the first portion 1031 and the second portion 1032 each are the half-wave plate. The two half-wave plates correspond to the wavelengths of laser beams of two different colors respectively.

For example, the first portion 1031 and the second portion 1032 are each the half-wave plate. As shown in FIG. 15B, the first portion 1031 corresponds to the wavelength of the third color laser beam, and the second portion 1032 corresponds to the wavelength of the second color laser beam. Alternatively, as shown in FIG. 15A, the first portion 1031 corresponds to the wavelength of the third color laser beam, and the second portion 1032 corresponds to the median wavelength (e.g., the wavelength of the cyan laser beam) between the wavelengths of the first color laser beam and the second color laser beam.

In some embodiments, two half-wave plates corresponding to the first portion 1031 and the second portion 1032 may be two independent wave plates or may alternatively be a one-piece member. For example, the polarization direction adjustment component 103 includes a substrate, the first portion 1031 is a portion of the substrate, and the second portion 1032 is another portion of the substrate.

Of course, the polarization direction adjustment component 103 may also include a first portion 1031, a second portion 1032, and a third portion. The first portion 1031, the second portion 1032, and the third portion each are three half-wave plates, and the three half-wave plates correspond to the wavelengths of laser beams of different colors, respectively. Moreover, the three half-wave plates may be separate piece members or a one-piece member, and the present disclosure is not limited thereto.

In this way, as shown in FIGS. 14A and 14B, the polarization direction of a portion of the laser beams of three colors may be adjusted before the laser beams of three colors emitted by the first laser device 101A enter the first combining lens group 102A, so that the laser beam of each color in the laser beams of three colors may have two polarization directions, thereby reducing the speckle phenomenon.

The above description is mainly given by considering an example in which the laser source assembly 10 includes one three-color laser device, Of course, in some embodiments, the laser source assembly 10 may further include a plurality of three-color laser devices.

The following is described by considering an example in which the laser device is as shown in FIGS. 9B and 90.

Figure 16A:
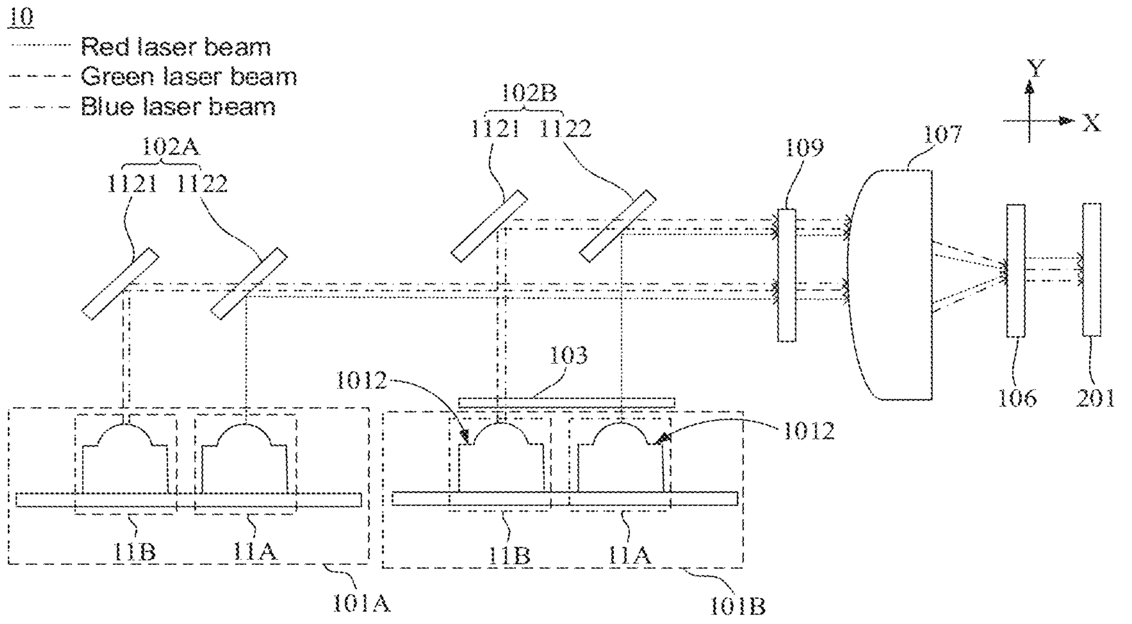
FIG. 16A is a diagram showing a structure of yet another laser source assembly, in accordance with some embodiments.
Figure 16B:
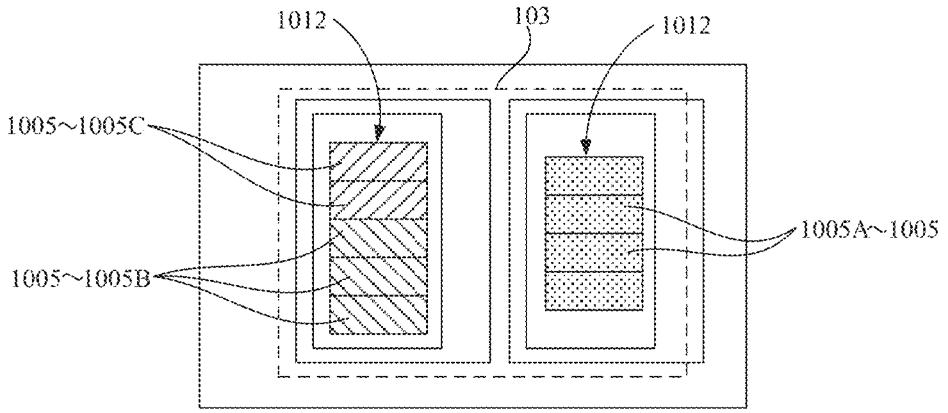
FIG. 16B is a diagram showing a structure of the polarization direction adjustment component shown in FIG. 16A.

FIG. 16A is a diagram showing a structure of yet another laser source assembly, in accordance with some embodiments. FIG. 16B is a diagram showing a structure of the polarization direction adjustment component shown in FIG. 16A.

In some embodiments, as shown in FIG. 16A, the laser source assembly 10 includes a first laser device 101A, a second laser device 101B, a first combining lens group 102A, a second combining lens group 102B, and a polarization direction adjustment component 103. The combination of the second laser device 101B and the second combining lens group 102E is the same as the combination of the first laser device 101A and the first combining lens group 102A, and the combination of the first laser device 101A and the first combining lens group 102A in FIG. 16A is the same as the combination of the first laser device 101A and the first combining lens group 102A in FIGS. 14A and 14B, and details will not be repeated herein.

The first combining lens group 102A and the second combining lens group 102B are sequentially arranged in the first direction X, and on the plane perpendicular to the first direction X, the orthogonal projection of the first combining lens group 102A is separated from the orthogonal projection of the second combining lens group 102B. In this way, it is possible to prevent the second combining lens group 102E from blocking the laser beams exiting from the first combining lens group 102A.

In this case, the polarization direction adjustment component 103 is located between the second laser device 101B and the second combining lens group 102B. Moreover, as shown in FIGS. 16A and 16B, on the laser-exit surface 1012 of the second laser device 101B, the orthogonal projection of the polarization direction adjustment component 103 may overlap the laser-exit surface 1012 of the second laser device 101B.

Here, the polarization direction adjustment component 103 may include three half-wave plates corresponding to the wavelengths of the laser beams of three colors. For the structures of the three half-wave plates, reference may be made to the relevant content of the first portion 1031, the second portion 1032, and the third portion of the polarization direction adjustment component 103 described above, and details will not be repeated herein. In this way, all of the laser beams of three colors emitted by the second laser device 101B may pass through the polarization direction adjustment component 103, and the laser beams of three color each may be converted by the polarization direction adjustment component 103 into a polarization direction differing by 90° from the original polarization direction, so that the polarization directions of the laser beams of three colors each may differ by 90° from the polarization direction of the laser beam of the corresponding color emitted by the first laser device 101A.

It will be noted that the laser source assembly 10 shown in FIG. 16A is described by considering an example in which 50% of the laser beams of three colors are changed in the polarization direction. Of course, it is also possible to change the polarization directions of other proportions of the laser beams of three colors in the laser source assembly 10 shown in FIG. 16A. For example, the polarization direction adjustment component 103 is arranged in a manner as shown in FIG. 15A or FIG. 15B.

In addition, the laser source assembly 10 shown in FIG. 16A is described by considering an example in which the polarization direction adjustment component 103 is disposed between the second laser device 101B and the second combining lens group 102B. Of course, in the laser source assembly 10 shown in FIG. 16A, the polarization direction adjustment component 103 may also be disposed between the first laser device 101A and the first combining lens group 102A. Alternatively, in some embodiments, the laser source assembly 10 shown in FIG. 16A may also include two polarization direction adjustment components 103 located on the laser-exit sides of the first laser device 101A and the second laser device 101B in FIG. 16A, respectively, so as to adjust the polarization directions of a portion of the laser beams before being combined. Moreover, the polarization direction adjustment component 103 overlaps half of the laser-exit surface of the corresponding laser device.

Figure 16C:
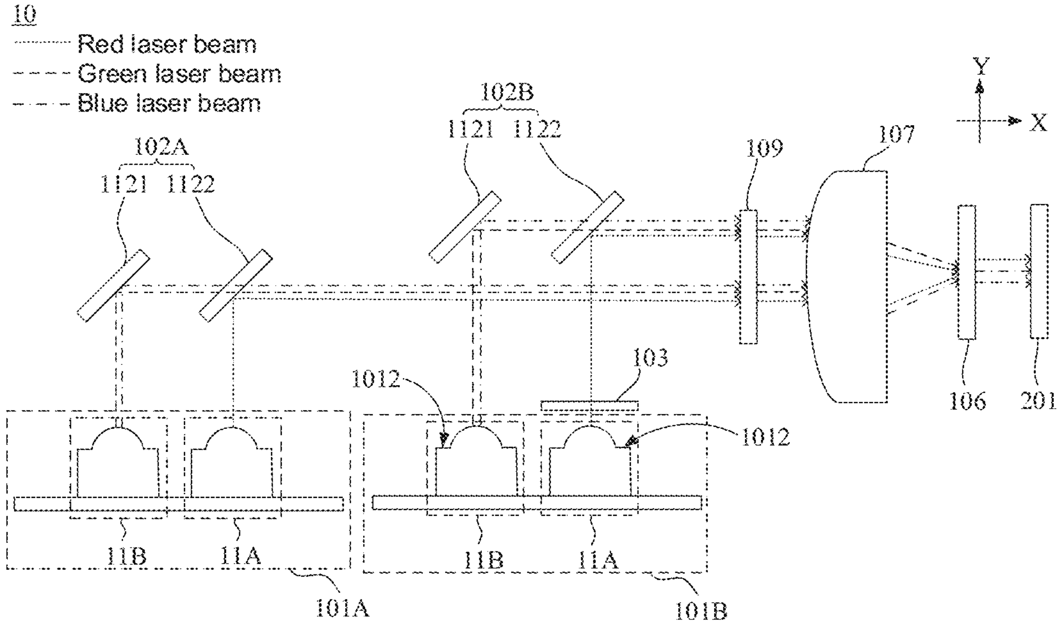
FIG. 16C is a diagram showing a structure of yet another laser source assembly, in accordance with some embodiments.
Figure 16D:
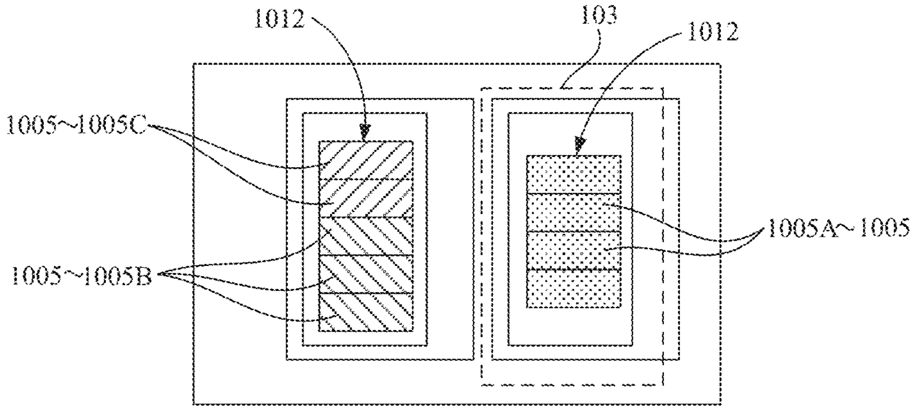
FIG. 16D is a diagram showing a structure of the polarization direction adjustment component shown in FIG. 16C.

FIG. 16C is a diagram showing a structure of yet another laser source assembly, in accordance with some embodiments. FIG. 16D is a diagram showing a structure of the polarization direction adjustment component shown in FIG. 16C.

Of course, in some embodiments, the polarization direction adjustment component 103 may also be configured to adjust the polarization directions of the laser beams corresponding to a portion of the plurality of colors. That is to say, the polarization direction adjustment component 103 may not adjust the polarization direction of the laser beam of each color.

For example, as shown in FIGS. 16C and 16D, in a case where the polarization direction adjustment component 103 adjusts the polarization direction of the third color laser beam, on the laser-exit surface 1012 of the second laser device 101B, the orthogonal projection of the polarization direction adjustment component 103 overlaps the laser-exit surface corresponding to the plurality of first light-emitting chips 1005A of the second laser device 101B.

Since the speckle phenomenon of the red laser beam (i.e., the third color laser beam) is relatively obvious, by arranging the polarization direction adjustment component 103 on the laser-exit region corresponding to the red laser beam in the second laser device 101B, it is possible to make the red laser beam emitted by the second laser device 101B have a different polarization direction from the red laser beam emitted by the first laser device 101A. In this way, the red laser beam may have two different polarization directions, so as to reduce the speckle phenomenon of the red laser beam.

For another example, in a case where the laser source assembly 10 is the laser source assembly 10 shown in FIG. 11B and the polarization direction adjustment component 103 adjusts the polarization direction of the third color laser beam, the polarization direction adjustment component 103 may adjust the polarization direction of the red laser beam emitted by the first laser device 101A or the second laser device 101B. Therefore, the polarization direction adjustment component 103 in FIG. 11B may be located between the second laser device 101B and the second combining lens group 102B or between the first laser device 101A and the first combining lens group 102A and overlap the laser-exit region corresponding to the red laser beam emitted by the first laser device 101A or the second laser device 101B.

It will be noted that since the second polarization conversion component B2 in FIG. 11B may change the polarization direction of the red laser beam emitted by the second laser device 101B, the polarization direction adjustment component 103 in the laser source assembly 10 shown in FIG. 11B may also be omitted, so as to achieve the function of the polarization direction adjustment component 103 through the second polarization conversion component B2.

For another example, in a case where the laser source assembly 10 is the laser source assembly 10 shown in FIG. 11A and the polarization direction adjustment component 103 adjusts the polarization direction of the third color laser beam, the polarization direction adjustment component 103 may adjust the polarization direction of the red laser beam emitted by the first laser device 101A or the second laser device 101B. Therefore, the polarization direction adjustment component 103 in FIG. 11A may be located between the second laser device 101B and the second combining lens group 102B or between the first laser device 101A and the first combining lens group 102A and overlap the laser-exit region corresponding to the red laser beam emitted by the first laser device 101A or the second laser device 101B.

Figure 16E:
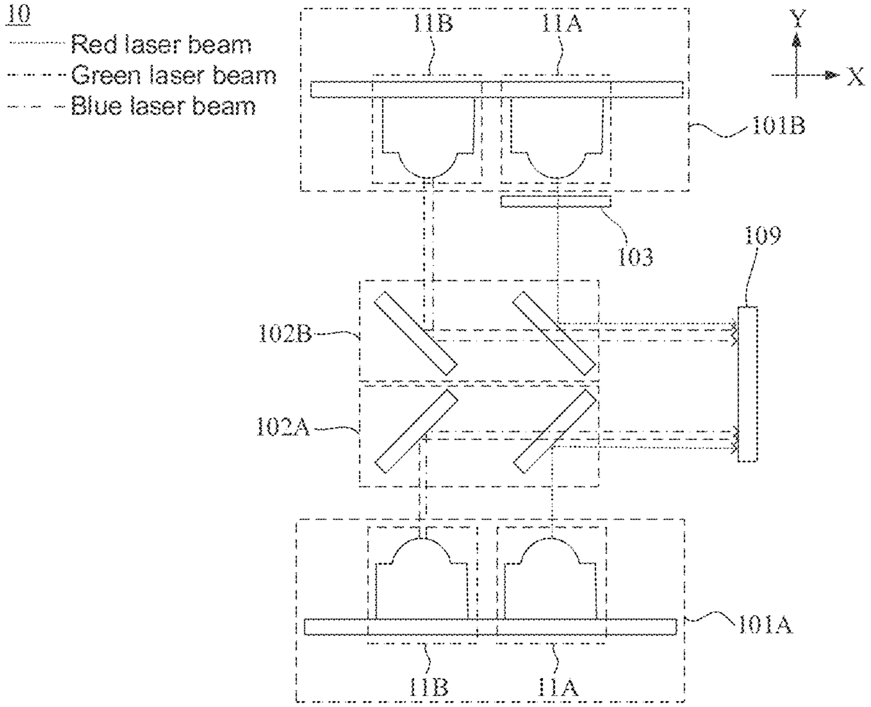
FIG. 16E is a diagram showing a structure of yet another laser source assembly, in accordance with some embodiments.

FIG. 16E is a diagram showing a structure of yet another laser source assembly, in accordance with some embodiments.

The two laser devices in the laser source assembly 10 shown in FIG. 16C may also be arranged in other manners. For example, as shown in FIG. 16E, the first laser device 101A and the second laser device 101B may be oppositely disposed with each other in the second direction Y. The first laser device 101A, the first combining lens group 102A, the second combining lens group 102B, and the second laser device 101B are sequentially arranged in the second direction Y. On the plane perpendicular to the first direction X, the orthogonal projection of the first combining lens group 102A is separated from the orthogonal projection of the second combining lens group 102B. The laser beams combined by the first combining lens group 102A and the second combining lens group 102B may be incident on a second light homogenizing component 109 in the first direction X. It will be noted that the second light homogenizing component 109 will be described below.

In this case, the polarization direction adjustment component 103 may be located between the second laser device 101B and the second combining lens group 102B and overlap the laser-exit region corresponding to the red laser beam emitted by the second laser device 101B. Of course, the polarization direction adjustment component 103 in FIG. 16E may also be located between the first laser device 101A and the first combining lens group 102A and overlap the laser-exit region corresponding to the red laser beam emitted by the first laser device 101A.

It will be noted that FIGS. 16C and 16E each illustrate an example in which the polarization direction adjustment component 103 changes the polarization direction of a portion of the laser beam of one color in the laser beams of three colors. Of course, the polarization direction adjustment component 103 may also change the polarization directions of portions of the laser beams of two colors, and details will not be repeated herein.

In addition, it can be understood that in a case where the laser source assembly 10 includes three or more laser devices, the above technical principles may also be used to adjust the polarization direction of a portion of the laser beam of one color, two colors, or all colors, and details will not be repeated herein. Moreover, the plurality of arrangement manners of the polarization direction adjustment component 103 described above may also be applicable to different structures of the laser source assembly 10.

Figure 17:
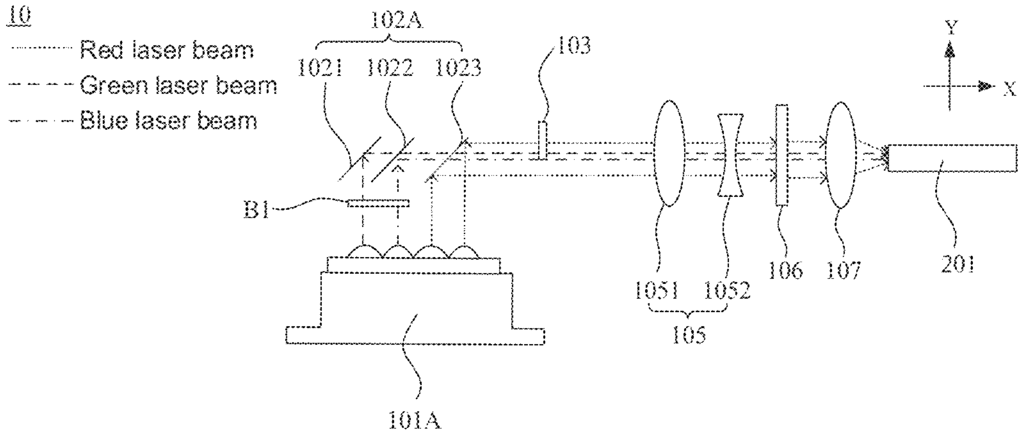
FIG. 17 is a diagram showing a structure of yet another laser source assembly, in accordance with some embodiments.

FIG. 17 is a diagram showing a structure of yet another laser source assembly, in accordance with some embodiments.

In some embodiments, as shown in FIG. 17, the laser source assembly 10 further includes a beam contraction component 105, a diffusion plate 106, and a converging lens 107 on the basis of the laser source assembly 10 in FIG. 8A. The beam contraction component 105, the diffusion plate 106, and the converging lens 107 are sequentially arranged in the first direction X. The beam contraction component 105 is configured to contract the incident laser beam, so as to reduce a beam width of the laser beam, Here, the beam width may be construed as a size of a section of a beam in a plane perpendicular to a propagation direction of the beam. The diffusion plate 106 is configured to diffuse the incident laser beam. The converging lens 107 is configured to converge the incident laser beam.

After the polarization direction adjustment component 103 adjusts the polarization directions of the laser beams to obtain the target laser beam, the target laser beam may pass through the beam contraction component 105, the diffusion plate 106, and the converging lens 107 in sequence and be incident on the first light homogenizing component 201, so as to display the projection image. The beam contraction component 105 may contract the incident laser beam and then propagate the laser beam to the diffusion plate 106. The diffusion plate 106 may diffuse the incident laser beam and then propagate the laser beam to the converging lens 107. The converging lens 107 may converge the incident laser beam to the first light homogenizing component 201, and the first light homogenizing component 201 may homogenize the incident laser beam. Here, the first light homogenizing component 201 may include a light pipe.

In some embodiments, as shown in FIG. 17, the beam contraction component 105 includes a convex lens 1051 and a concave lens 1052 that are arranged in the first direction X, and the convex lens 1051 is closer to the polarization direction adjustment component 103 than the concave lens

1052. The convex lens 1051 and the concave lens 1052 constitute a Galileo telescope.

However, the present disclosure is not limited thereto. In some embodiments, the beam contraction component 105 may include a Kepler telescope. Alternatively, the beam contraction component 105 may include two convex lenses. One of the two convex lenses is configured to converge the laser beam to another convex lens, and the another convex lens serves as a field lens, so as to reduce the divergence angle of the converged laser beam, thereby achieving beam contraction of the laser beam.

It will be noted that the beam contraction component 105, the diffusion plate 106 and the converging lens 107 in FIG. 17 may also be used in the laser source assembly 10 shown in FIGS. 8B, 11A to 14B, 16A, 16C, and 16E.

In addition, for the laser source assembly 10 in FIG. 11B, the laser beams emitted by the first laser device 101A and the laser beams emitted by the second laser device 101B may be directly combined at the polarization beam splitter 1026, and the laser beams after being combined is thin. Therefore, there is no need to provide the beam contraction component 105 in the laser source assembly 10 in FIG. 11B, which is conducive to reducing the volume of the laser source assembly 10.

The above description is given by considering an example in which the converging lens 107 is located on a laser-exit side of the diffusion plate 106 and the first light homogenizing component 201 includes the light pipe. However, the positions of the converging lens 107 and the diffusion plate 106 may also be arranged in other manners.

In some embodiments, as shown in FIGS. 14A and 14B, the laser source assembly 10 includes a second light homogenizing component 109, a converging lens 107, and a diffusion plate 106. The second light homogenizing component 109 is located on the laser-exit side of the first combining lens group 102A and configured to homogenize the incident laser beam, so as to improve the uniformity of the laser beam. The converging lens 107 may be located on a laser-exit side of the second light homogenizing component 109 and configured to converge the incident laser beam. The diffusion plate 106 may be located on a laser-exit side of the converging lens 107 and configured to diffuse the incident laser beam.

For example, the laser beams of three colors combined by the first combining lens group 102A are incident on the second light homogenizing component 109. The second light homogenizing component 109 homogenizes the laser beams of three colors, so as to improve the uniformity of the laser beams of three colors. The laser beams homogenized by the second light homogenizing component 109 are converged to the diffusion plate 106 by the converging lens 107. The diffusion plate 106 diffuses the converged laser beams to homogenize the laser beams, and the diffused laser beams may be incident on the first light homogenizing component 201 at a large angle. For example, the diffused laser beams enter the first light homogenizing component 201 at an angle of approximately parallel light. The laser beams after passing through the first light homogenizing component 201 may be applied in the subsequent illumination path and enter the light valve 202 and the projection lens 30 in sequence. Here, the second light homogenizing component 109 and the first light homogenizing component 201 each may be a group of fly-eye lenses.

In the laser source assembly 10 provided in some embodiments of the present disclosure, the laser beams of a plurality of colors emitted by one or more laser devices may be incident on the polarization direction adjustment component 103 after being combined. The polarization direction adjustment component 103 may adjust the polarization direction of at least a portion of the incident laser beams, so that at least one laser beam of a same color in the laser beams of a plurality of colors may have different polarization directions. Alternatively, the laser beams of a plurality of colors emitted by one or more laser devices may be incident on the polarization direction adjustment component 103 before being combined, and the laser beams of a plurality of colors may be combined by a combining lens group after the polarization direction of a portion of the laser beams is adjusted by the polarization direction adjustment component 103.

Moreover, the polarization direction adjustment component 103 may be of a small size and located in the beam path of a portion of the laser beams of a plurality of colors, so as to change the polarization direction of the portion of the laser beams. Alternatively, the polarization direction adjustment component 103 may also be located in the beam path of all the laser beams of a plurality of colors and change the polarization directions of the laser beams through a plurality of different portions of the polarization direction adjustment component 103, so as to change the polarization direction of a portion of the laser beams of a plurality of colors. In this way, laser beams of different colors used for projection display may have different polarization directions, which may reduce coherence of the laser beams of a plurality of colors, thereby reducing the speckle phenomenon and improving the projection effect of the projection apparatus 1000.

In addition, the portion of the laser beams whose polarization direction is adjusted by the polarization direction adjustment component 103 may be half of the laser beams of a plurality of colors. That is to say, the laser beam whose polarization direction is adjusted by the polarization direction adjustment component 103 may occupy half of the area of the combined beam spot. In this way, the laser beams emitted by the laser source assembly 10 have a good uniformity, which is conducive to improving the display effect of the projection image.

In the above description of the embodiments, specific features, structures, materials, or characteristics may be combined in a suitable manner in any one or more embodiments or examples.

A person skilled in the art will understand that the scope of disclosure in the present disclosure is not limited to specific embodiments discussed above and may modify and substitute some elements of the embodiments without departing from the spirits of the present disclosure. The scope of the present disclosure is limited by the appended claims.

What is claimed is:

1. A laser source assembly, comprising:

at least one laser device configured to emit laser beams of a plurality of colors;

at least one combining lens group located on a laser-exit side of the at least one laser device, the at least one combining lens group being configured to combine the laser beams of the plurality of colors and propagate the combined laser beams in a first direction; and at least one polarization direction adjustment component configured to adjust a polarization direction of at least a portion of the laser beams of the plurality of colors, so as to obtain a target laser beam;

wherein a laser beam of at least one color in the target laser beam satisfies that, a polarization direction of a portion of the laser beam of a same color is different from a polarization direction of another portion of the laser beam of the same color;

the polarization direction adjustment component is located on a laser-exit side of the at least one combining lens group, and on a plane perpendicular to the first direction, the orthogonal projection of the polarization direction adjustment component overlaps with at least a portion of an orthogonal projection of the combining lens group; wherein the polarization direction adjustment component satisfies one of following:

on the plane perpendicular to the first direction, the orthogonal projection of the polarization direction adjustment component overlaps with a portion of the orthogonal projection of the combining lens group; a portion of the laser beams of the plurality of colors combined by the combining lens group is incident on the polarization direction adjustment component, and the polarization direction adjustment component is configured to adjust the polarization direction of the portion of the laser beams; and on the plane perpendicular to the first direction, the orthogonal projection of the polarization direction adjustment component overlaps with all the orthogonal projection of the combining lens group; all laser beams of the plurality of colors combined by the combining lens group are incident on the polarization direction adjustment component, and the polarization direction adjustment component includes a first portion and a second portion, wherein the first portion and the second portion are alternately arranged, and the first portion and the second portion are configured to adjust the laser beam of a same color by different spatial phases.

2. The laser source assembly according to claim 1, wherein the polarization direction adjustment component includes any one of a half-wave plate, a quarter-wave plate, and a three-quarter-wave plate.

3. The laser source assembly according to claim 1, wherein the polarization direction adjustment component satisfies one of following:

the first portion includes any one of a half-wave plate, a quarter-wave plate, and a three-quarter-wave plate, and the second portion includes a transparent material; and the first portion and the second portion include any two of the half-wave plate, the quarter-wave plate, and the three-quarter-wave plate.

4. The laser source assembly according to claim 1, wherein the at least one laser device includes a first laser device configured to emit a first color laser beam, a second color laser beam, and a third color laser beam;

the at least one combining lens group includes a first combining lens group located on a laser-exit side of the first laser device and configured to combine the first color laser beam, the second color laser beam, and the third color laser beam;

the polarization direction adjustment component is located on a laser-exit side of the first combining lens group, and on the plane perpendicular to the first direction, the orthogonal projection of the polarization direction adjustment component overlaps with at least a portion of an orthogonal projection of the first combining lens group.

5. The laser source assembly according to claim 1, wherein the at least one laser device includes:

a first laser device configured to emit a first color laser beam, a second color laser beam, and a third color laser beam; and a second laser device configured to emit at least one of the first color laser beam, the second color laser beam, or the third color laser beam;

the at least one combining lens group includes:

a first combining lens group located on a laser-exit side of the first laser device, the first combining lens group being configured to combine the first color laser beam, the second color laser beam, and the third color laser beam and propagate the combined laser beams in the first direction; and a second combining lens group located on a laser-exit side of the second laser device, and the second combining lens group being configured to reflect the incident laser beam in the first direction and on the plane perpendicular to the first direction, an orthogonal projection of the first combining lens group being separated from an orthogonal projection of the second combining lens group;

wherein the first combining lens group, the second combining lens group, and the polarization direction adjustment component are sequentially arranged in the first direction and on the plane perpendicular to the first direction, the orthogonal projection of the polarization direction adjustment component overlaps with at least a portion of at least one of the orthogonal projection of the first combining lens group or the orthogonal projection of the second combining lens group.

6. The laser source assembly according to claim 1, wherein the at least one laser device includes:

a first laser device configured to emit a first color laser beam, a second color laser beam, and a third color laser beam, the third color laser beam being a first polarized laser beam, the first color laser beam and the second color laser beam being a second polarized laser beam, and a polarization direction of the first polarized laser beam being perpendicular to a polarization direction of the second polarized laser beam; and a second laser device configured to emit the third color laser beam;

the at least one combining lens group includes:

a first combining lens group located on a laser-exit side of the first laser device, the first combining lens group being configured to combine the first color laser beam, the second color laser beam, and the third color laser beam and propagate the combined laser beams in the first direction; and a second combining lens group located on a laser-exit side of the second laser device, the second combining lens group being configured to transmit the first polarized laser beam and reflect the second polarized laser beam, and on the plane perpendicular to the first direction, an orthogonal projection of the first combining lens group at least partially overlapping with an orthogonal projection of the second combining lens group;

the laser source assembly further includes:

a first polarization conversion component located between the first laser device and the first combining lens group, on a laser-exit surface of the first laser device, an orthogonal projection of the first polarization conversion component overlapping with laser-exit regions corresponding to the first color laser beam and the second color laser beam, and the first polarization conversion component being configured to convert the second polarized laser beam emitted by the first laser device into the first polarized laser beam; and a second polarization conversion component located between the second laser device and the second combining lens group on a laser-exit surface of the second laser device, an orthogonal projection of the second polarization conversion component overlapping with the laser-exit surface of the second laser device, and the second polarization conversion component being configured to convert the first polarized laser beam emitted by the second laser device into the second polarized laser beam;

wherein the first combining lens group, the second combining lens group, and the polarization direction adjustment component are sequentially arranged in the first direction and on the plane perpendicular to the first direction, the orthogonal projection of the polarization direction adjustment component overlaps with at least a portion of the orthogonal projections of the first combining lens group and the second combining lens group.

7. The laser source assembly according to claim 1, wherein the at least one laser device includes:

a first laser device configured to emit a first color laser beam;

a second laser device configured to emit a second color laser beam; and a third laser device configured to emit a third color laser beam;

the at least one combining lens group includes:

a first combining sub-lens located on a laser-exit side of the first laser device, the first combining sub-lens being configured to transmit the first color laser beam and reflect the second color laser beam;

a second combining sub-lens located on a laser-exit side of the second laser device, the second combining sub-lens being configured to reflect the second color laser beam to the first combining sub-lens; and a third combining sub-lens located on a laser-exit side of the third laser device and a laser-exit side of the first combining sub-lens, the third combining sub-lens being configured to transmit the third color laser beam and reflect the first color laser beam and the second color laser beam;

wherein the third laser device, the third combining sub-lens, and the polarization direction adjustment component are sequentially arranged in the first direction; the first laser device, the first combining sub-lens, and the third combining sub-lens are sequentially arranged in a second direction; the first combining sub-lens and the second combining sub-lens are sequentially arranged in the first direction, and the second direction is perpendicular to the first direction;

on the plane perpendicular to the first direction, the orthogonal projection of the polarization direction adjustment component overlaps with at least a portion of an orthogonal projection of the third combining sub-lens.

8. The laser source assembly according to claim 1, wherein on the plane perpendicular to the first direction, the orthogonal projection of the polarization direction adjustment component overlaps with half of the orthogonal projection of the combining lens group, so that half of the laser beams of the plurality of colors is adjusted in polarization direction by the polarization direction adjustment component.

9. A laser source assembly, comprising:

at least one laser device configured to emit laser beams of a plurality of colors;

at least one combining lens group located on a laser-exit side of the at least one laser device, the at least one combining lens group being configured to combine the laser beams of the plurality of colors and propagate the combined laser beams in a first direction; and at least one polarization direction adjustment component configured to adjust a polarization direction of at least a portion of the laser beams of the plurality of colors, so as to obtain a target laser beam;

wherein a laser beam of at least one color in the target laser beam satisfies that, a polarization direction of a portion of the laser beam of a same color is different from a polarization direction of another portion of the laser beam of the same color;

the polarization direction adjustment component is located between the at least one laser device and the at least one combining lens group, and an orthogonal projection of the polarization direction adjustment component on a laser-exit surface of the laser device overlaps with at least a portion of the laser-exit surface of the laser device; wherein the polarization direction adjustment component satisfies one of following:

on the laser-exit surface of the laser device, the orthogonal projection of the polarization direction adjustment component overlaps with a portion of the laser-exit surface of the laser device; a portion of the laser beams of the plurality of colors emitted by the laser device is incident on the polarization direction adjustment component, and the polarization direction adjustment component is configured to adjust the polarization direction of the portion of the laser beams; and on the laser-exit surface of the laser device, the orthogonal projection of the polarization direction adjustment component overlaps with the laser-exit surface of the laser device; all laser beams of the plurality of colors emitted by the laser device are incident on the polarization direction adjustment component, and the polarization direction adjustment component includes a first portion and a second portion, wherein on the laser-exit surface of the laser device, an orthogonal projection of the first portion overlapping with a portion of a laser-exit region corresponding to the laser beam of at least one color; and on the laser-exit surface of the laser device, an orthogonal projection of the second portion overlapping with a laser-exit region of the laser device outside the orthogonal projection of the first portion, the first portion and the second portion corresponding to the laser beams of different colors;

wherein the at least one laser device includes:

a base plate;

a first light-emitting chip group including a plurality of first light-emitting chips configured to emit a third color laser beam;

a second light-emitting chip group including a plurality of second light-emitting chips configured to emit a first color laser beam and a plurality of third light-emitting chips configured to emit a second color laser beam; and two tube shells disposed on the base plate and respectively surrounding the first light-emitting chip group and the second light-emitting chip group;

wherein on the laser-exit surface of the laser device, the orthogonal projection of the polarization direction adjustment component overlaps with at least one of a portion of an orthogonal projection of the first light-emitting chip group or a portion of an orthogonal projection of the second light-emitting chip group.

10. The laser source assembly according to claim 9, wherein the at least one laser device includes a first laser device configured to emit a first color laser beam, a second color laser beam, and a third color laser beam;

the at least one combining lens group includes a first combining lens group located on a laser-exit side of the first laser device and configured to combine the first color laser beam, the second color laser beam, and the third color laser beam;

the polarization direction adjustment component is located between the first laser device and the first combining lens group, and on a laser-exit surface of the first laser device, the orthogonal projection of the polarization direction adjustment component overlaps with at least a portion of the laser-exit surface of the first laser device.

11. The laser source assembly according to claim 9, wherein the at least one laser device includes:

a first laser device configured to emit a first color laser beam, a second color laser beam, and a third color laser beam; and a second laser device configured to emit one of the first color laser beam, the second color laser beam, and the third color laser beam;

the at least one combining lens group includes:

a first combining lens group located on a laser-exit side of the first laser device, the first combining lens group being configured to combine the first color laser beam, the second color laser beam, and the third color laser beam, and propagate the combined laser beams in the first direction; and a second combining lens group located on a laser-exit side of the second laser device, the second combining lens group being configured to reflect the incident laser beam in the first direction and on the plane perpendicular to the first direction, an orthogonal projection of the first combining lens group being separated from an orthogonal projection of the second combining lens group;

wherein the polarization direction adjustment component satisfies at least one of following:

the polarization direction adjustment component is located between the first laser device and the first combining lens group, and on a laser-exit surface of the first laser device, the orthogonal projection of the polarization direction adjustment component overlaps with at least a portion of the laser-exit surface of the first laser device;

or, the polarization direction adjustment component is located between the second laser device and the second combining lens group, and on a laser-exit surface of the second laser device, the orthogonal projection of the polarization direction adjustment component overlaps with at least a portion of the laser-exit surface of the second laser device.

12. The laser source assembly according to claim 11, wherein the at least one polarization direction adjustment component includes two polarization direction adjustment components located on the laser-exit sides of the first laser device and the second laser device, respectively, and each of the two polarization direction adjustment components overlaps half of the laser-exit surface of a corresponding laser device.

13. The laser source assembly according to claim 11, wherein the at least one polarization direction adjustment component includes one polarization direction adjustment component located between the second laser device and the second combining lens group;

wherein on the laser-exit surface of the second laser device, the orthogonal projection of the polarization direction adjustment component overlaps with the laser-exit surface of the second laser device, and the polarization direction adjustment component is configured to adjust the polarization direction of the laser beam of one color emitted by the second laser device.

14. The laser source assembly according to claim 11, wherein the at least one polarization direction adjustment component includes one polarization direction adjustment component located between the first laser device and the first combining lens group;

wherein on the laser-exit surface of the first laser device, the orthogonal projection of the polarization direction adjustment component overlaps with a portion of the laser-exit surface of the first laser device that emits the laser beam of a same color as the laser beam emitted by the second laser device, the polarization direction adjustment component is configured to adjust the polarization direction of the laser beam emitted by the first laser device that has the same color as the laser beam emitted by the second laser device.

15. The laser source assembly according to claim 11, satisfying one of following:

the first laser device and the second laser device are sequentially arranged in the first direction; and the first laser device, the first combining lens group, the second combining lens group, and the second laser device are sequentially arranged in a second direction, and the second direction is perpendicular to the first direction.

16. The laser source assembly according to claim 9, wherein the polarization direction adjustment component overlaps half of the laser-exit surface of the laser device.

17. The laser source assembly according to claim 16, wherein the polarization direction adjustment component satisfies one of following:

the polarization direction adjustment component overlaps half of the plurality of first light-emitting chips, half of the plurality of second light-emitting chips, and half of the plurality of third light-emitting chips; and the polarization direction adjustment component overlaps a portion of the plurality of first light-emitting chips, the plurality of third light-emitting chips, and a portion of the plurality of second light-emitting chips; and the polarization direction adjustment component overlaps the plurality of first light-emitting chips.

18. A projection apparatus, comprising:

a laser source assembly including the laser source assembly according to claim 1, the laser source assembly being configured to emit illumination beams;

a light modulation assembly configured to modulate the illumination beams emitted by the laser source assembly, so as to obtain projection beams; and a projection lens configured to project the projection beams into a projection image.

* * * * *